(12) United States Patent
Forseth et al.

(10) Patent No.: US 12,521,812 B2
(45) Date of Patent: Jan. 13, 2026

(54) METAL WIRE FEEDING SYSTEM

(71) Applicant: Norsk Titanium AS, Honefoss (NO)

(72) Inventors: Trond Forseth, Ringerike (NO); Arne Ramsland, Hole (NO); Tom-Erik Falla, Jevnaker (NO); Brede Vigdal, Tyristrand (NO); Dyre Rolstad, Brandbu (NO)

(73) Assignee: Norsk Titanium AS, Hønefoss (NO)

( * ) Notice: Subject to any disclaimer, the term of this patent is extended or adjusted under 35 U.S.C. 154(b) by 0 days.

(21) Appl. No.: 18/667,907

(22) Filed: May 17, 2024

(65) Prior Publication Data

US 2025/0058400 A1    Feb. 20, 2025

Related U.S. Application Data

(60) Continuation of application No. 16/719,880, filed on Dec. 18, 2019, now Pat. No. 12,097,578, which is a
(Continued)

(51) Int. Cl.
    B23K 9/133    (2006.01)
    B23K 9/04    (2006.01)
    (Continued)

(52) U.S. Cl.
    CPC .............. B23K 9/133 (2013.01); B23K 9/044 (2013.01); B23K 9/1333 (2013.01);
    (Continued)

(58) Field of Classification Search
    CPC .. B23K 26/324; B23K 26/342; B23K 26/348; B23K 9/04; B23K 9/042; B23K 9/044; B23K 9/1093; B23K 9/12; B23K 9/124; B23K 9/125; B23K 9/126; B23K 9/133; B23K 9/1333; B23K 9/1336; B23K 9/16; B23K 9/164; B23K 9/167; B23K 9/1675; B23K 9/173; B23K 9/1735; B23K 9/293; B23K 9/295; B23K 15/0006;
    (Continued)

(56) References Cited

U.S. PATENT DOCUMENTS

| 933,890 A | 9/1909 | Cummings |
|---|---|---|
| 3,567,900 A | 3/1971 | Nelson et al. |

(Continued)

FOREIGN PATENT DOCUMENTS

| CA | 2648208 C | 5/2011 |
|---|---|---|
| CN | 203143760 U | 8/2013 |

(Continued)

OTHER PUBLICATIONS

Australian Office Action mailed Jan. 21, 2022 for Australian Patent Application No. 2017294305, a foreign counterpart to U.S. Pat. No. 10,549,375, 4 pages.

(Continued)

*Primary Examiner* — Hung D Nguyen
(74) *Attorney, Agent, or Firm* — Lee & Hayes, P.C.

(57) ABSTRACT

Provided are a systems and methods for continuously providing a metal wire to a welding torch for manufacturing objects by solid freeform fabrication to provide continuous deposition of metal to the freeform object, especially objects made with titanium or titanium alloy wire.

20 Claims, 8 Drawing Sheets

Related U.S. Application Data division of application No. 15/206,169, filed on Jul. 8, 2016, now Pat. No. 10,549,375.

(51) Int. Cl.

| | | |
|---|---|---|
| *B23K 15/00* | (2006.01) | |
| *B23K 26/342* | (2014.01) | |
| *B33Y 40/00* | (2020.01) | |
| *B65H 49/32* | (2006.01) | |
| *B65H 51/10* | (2006.01) | |
| *B65H 59/38* | (2006.01) | |
| *B21F 23/00* | (2006.01) | |
| *B23K 103/14* | (2006.01) | |

(52) U.S. Cl.
CPC ........ *B23K 15/0006* (2013.01); *B23K 26/342* (2015.10); *B33Y 40/00* (2014.12); *B65H 49/32* (2013.01); *B65H 49/325* (2013.01); *B65H 51/10* (2013.01); *B65H 59/387* (2013.01); *B21F 23/00* (2013.01); *B23K 2103/14* (2018.08); *B65H 2701/36* (2013.01)

(58) Field of Classification Search
CPC ............ B23K 15/0016; B23K 15/0033; B23K 15/0086; B23K 15/0093; B23K 15/10; B23K 2103/06; B23K 2103/08; B23K 2103/14; B23K 2103/26; B65H 49/18; B65H 49/32; B65H 49/325; B65H 49/34; B65H 59/38; B65H 59/387; B65H 59/40; B65H 51/10; B65H 2701/36; B33Y 40/00; B33Y 40/10; B21F 23/00; Y02P 10/25

See application file for complete search history.

(56) References Cited

U.S. PATENT DOCUMENTS

| | | | |
|---|---|---|---|
| 4,280,350 A | 7/1981 | King et al. | |
| 5,402,927 A | 4/1995 | Frasch | |
| 5,628,301 A | 5/1997 | Katamachi | |
| 5,820,008 A | 10/1998 | College | |
| 7,220,935 B2 | 5/2007 | Ireland et al. | |
| 9,067,256 B2 | 6/2015 | Anagnostopoulos | |
| 9,145,832 B2 | 9/2015 | Comon et al. | |
| 2002/0108985 A1 | 8/2002 | Garcia et al. | |
| 2005/0006363 A1 | 1/2005 | Hsu et al. | |
| 2006/0185473 A1 | 8/2006 | Withers et al. | |
| 2008/0035624 A1* | 2/2008 | Ertmer ................... | B23K 9/124 219/137.7 |
| 2008/0156783 A1 | 7/2008 | Vanden Heuvel et al. | |
| 2010/0193480 A1 | 8/2010 | Adams | |
| 2010/0276396 A1 | 11/2010 | Cooper et al. | |
| 2011/0132880 A1* | 6/2011 | Kossowan ......... | B23K 37/0276 219/76.14 |
| 2012/0193326 A1* | 8/2012 | Mitsuyasu ............... | B23H 7/04 219/69.17 |
| 2013/0140280 A1 | 6/2013 | Biskup et al. | |
| 2013/0193126 A1* | 8/2013 | Anderson ............ | B65H 59/387 219/137.2 |
| 2014/0061165 A1 | 3/2014 | Stempfer | |
| 2014/0091070 A1* | 4/2014 | Burns .................. | B23K 9/1336 219/137.8 |
| 2014/0203000 A1* | 7/2014 | Mitsuyasu ............... | B23H 7/04 219/124.21 |
| 2017/0165779 A1 | 6/2017 | Barhorst et al. | |

FOREIGN PATENT DOCUMENTS

| | | | |
|---|---|---|---|
| CN | 105525371 A | 4/2016 | |
| DE | 4320405 A1 | 12/1994 | |
| EP | 2898977 A2 | 7/2015 | |
| JP | S53-120711 A | 10/1978 | |
| JP | S54117348 A | 9/1979 | |
| JP | S55-038560 A | 3/1980 | |
| JP | S58-170169 A | 11/1983 | |
| JP | S63-086354 A | 1/1990 | |
| JP | H10-324458 A | 12/1998 | |
| JP | 2010052021 A | 3/2010 | |
| JP | 2010-099710 A | 5/2010 | |
| JP | 2015-139786 A | 8/2015 | |
| WO | WO2011019287 A2 | 2/2011 | |

OTHER PUBLICATIONS

Canadian Office Action mailed May 4, 2023 for Canadian patent applicatoin No. 3,029,846, a foreign counterpart of U.S. Pat. No. 10,549,375, 5 pages.
Chinese Office Action issued for CN Patent Application No. 2017800423493, mailed Sep. 21, 2020, 3 pages.
Search Report issued for Chinese Patent Application No. 2017800423493, dated Sep. 9, 2020, 3 pages.
Japanese Office Action for JP Patent Application No. 2019-500581, issued Mar. 3, 2021, 11 pages.
Japanese Office Action mailed Nov. 9, 2021 for Japanese Patent Application No. 2019-500581, a foreign counterpart to U.S. Pat. No. 10,549,375, 3 pages.
Office Action for Korean Patent Application No. 10-2019-7000539, mailed Jan. 25, 2021, (with English translation), 7 pages.
Notice of Allowance for Korean Patent Application No. 10-2019-7000539, mailed Apr. 25, 2021 (with English translation), 3 pages.
Office Action for U.S. Appl. No. 16/719,880, mailed on Dec. 23, 2022, Forseth, "Metal Wire Feeding System", 15 pages.
Office Action for U.S. Appl. No. 16/719,880, mailed on Nov. 17, 2023, Trond Forseth, "Metal Wire Feeding System", 17 pages.

* cited by examiner

METAL WIRE FEEDING SYSTEM

This application is a continuation of prior application Ser. No. 16/719,880, filed Dec. 18, 2019, titled "METAL WIRE FEEDING SYSTEM," which is a divisional of prior application Ser. No. 15/206,169, filed Jul. 8, 2016, titled "METAL WIRE FEEDING SYSTEM," which are incorporated herein by reference.

FIELD OF THE INVENTION

The present invention relates to a system and method of feeding metal wire for manufacturing objects by solid freeform fabrication, especially objects made from titanium and titanium alloy wire.

BACKGROUND OF THE INVENTION

Structured metal parts made of titanium or titanium alloys are conventionally made by casting, forging or machining from a billet. These techniques have a disadvantage of high material waste of the expensive titanium metal and large lead times in the fabrication of the metal part.

Fully dense physical objects may be made by a manufacturing technology known as rapid prototyping, rapid manufacturing, layered manufacturing, solid freeform fabrication, additive fabrication, additive manufacturing or 3D printing. This technique employs computer aided design software (CAD) to first construct a virtual model of the object which is to be made, and then transform the virtual model into thin parallel slices or layers, usually horizontally oriented. The physical object may then be made by laying down successive layers of raw material in the form of liquid, paste, powder or other layerable, spreadable or fluid form, such as melted metal, e.g., from a melted welding wire, or preformed as sheet material resembling the shape of the virtual layers until the entire object is formed. The layers are fused together to form a solid dense object.

Solid freeform fabrication is a flexible technique allowing creation of objects of almost any shape at relatively fast production rates, typically varying from some hours to several days for each object. The technique is thus suited for formation of prototypes and small production series, and can be scaled-up for large volume production.

The technique of layered manufacturing may be expanded to include deposition of pieces of the construction material, that is, each structural layer of the virtual model of the object is divided into a set of pieces which when laid side by side form the layer. This allows forming metallic objects by welding a wire onto a substrate in successive stripes forming each layer according to the virtual layered model of the object, and repeating the process for each layer until the entire physical object is formed. The accuracy of the welding technique is usually too coarse to allow directly forming the object with acceptable dimensions. The formed object will thus usually be considered a green object or pre-form which needs to be machined to acceptable dimensional accuracy.

It is known to use a plasma arc to provide the heat for welding metallic materials. This method may be employed at atmospheric or higher pressures, and thus allow simpler and less costly process equipment. One such method is known as gas tungsten arc welding (GTAW, also denoted as TIG) where a plasma transferred arc is formed between a non-consumable tungsten electrode and the welding area. The plasma arc is usually protected by a gas being fed through the plasma torch forming a protective gas shield around the arc. TIG welding may include feeding a metal wire or metal powder into the melting pool or the plasma arc as a filler material. Other welding methods include gas metal arc welding (GMAW), metal inert gas (MIG) welding and metal active gas (MAG) welding, were an electric arc between a consumable electrode, such as a metal wire, and the workpiece heats and melts the metal.

It is known (e.g., see Adams, U.S. Pat. Pub. No. 2010/0193480) to use a TIG-welding torch to build objects by solid freeform fabrication (SFFF), where successive layers of metallic feedstock material with low ductility are deposited onto a substrate. A plasma arc is created by energizing a flowing gas using an electrode, the electrode having a variable magnitude electric current supplied thereto. The plasma stream can be directed towards a predetermined targeted region to preheat the predetermined targeted region of the workpiece prior to deposition. The current is adjusted and the feedstock material is fed into the plasma stream to deposit molten feedstock in the predetermined targeted region. The electric current is adjusted and the molten feedstock is slowly cooled at an elevated temperature, typically above the brittle to ductile transition temperature of the feedstock material, in a cooling phase to minimize the occurrence of material stresses.

Withers et al. (U.S. Pat. Pub. No. 2006/185473) also describes using a TIG torch in place of the expensive laser traditionally used in a solid freeform fabrication (SFFF) process with relatively low cost titanium feed material by combining the titanium feed and alloying components in a way that considerably reduces the cost of the raw materials. More particularly, in one aspect the present invention employs pure titanium wire (CP Ti) which is lower in cost than alloyed wire, and combines the CP Ti wire with powdered alloying components in-situ in the SFFF process by combining the CP Ti wire and the powder alloying components in the melt of the welding torch or other high power energy beam. In another embodiment, the invention employs titanium sponge material mixed with alloying elements and formed into a wire where it may be used in an SFFF process in combination with a plasma welding torch or other high power energy beam to produce near net shaped titanium components.

In order to effectively deposit metal from a metal wire onto the surface of a work piece using a welding torch, it is necessary to maintain the metal wire in the correct position relative to the welding torch. Metal wire often is provided off of a spool. The output torque of motors driving rotation of the wire spool can be a limiting factor in providing wire at a steady state, particularly from a fully loaded spool. The rotational inertia of the wire on the spool can limit the speed and acceleration rate at which the wire can be unwound off of the spool to be delivered to the welding torch. Modulation in rotational inertia, speed and/or acceleration can be sufficient to cause slippage from the rollers, guiding wheels or clamping devices used to deliver the wire to the plasma arc of the contact tip assembly. Slippage can result in deformation of the wire, and also creating a deviation in the desired position and angle of the wire relative to the plasma arc. Slippage also limits the operating speed of the fabricating equipment.

Changes in rotational mass, speed and/or acceleration of the bulk wire also can result in variation in the wire feed speed and variations in the amount of tension in the metal wire. If the variation in wire feed speed or acceleration of the wire at the wire source results in too much tension between the wire source and the feeder rollers and pulleys that deliver the wire to the plasma arc of the welding torch, the increased tension can result in the formation a kink, bend or other deformation in the wire. High tension also can result in metal wire being pulled back toward the wire source, which would prevent feed of metal wire to the welding electrode, resulting in an unwanted discontinuous deposition layer, or an unintended hole or gap in the layer being deposited on the freeform object being made. If the tension is too low, an excess of slack wire can result. The excess wire can become entangled with itself or a part of the machinery, which can cause bends or kinks in the wire, making it difficult or impossible to correctly position the wire relative to the plasma arc.

In addition, unwinding of the wire from the spool results in changes in the position of the wire as it leaves the spool due to the coiled nature of the wire on the spool. At higher rates of use, the horizontal and vertical position of the wire rapidly can change, which can result in slippage from the rollers, guiding wheels or clamping devices used to deliver the wire to the welding torch.

Accordingly, there exists a need in this art for an economical method of performing freeform fabrication at an increased rate of metal deposition. Furthermore, there exists a need in this art for a system and method of increasing the amount of metal wire that can be provided to a welding torch without slippage or deformation of the metal wire in order to increase the throughput and yield of direct metal deposition formed products.

SUMMARY OF THE INVENTION

An objective of the present invention is to provide a system for delivery of metal wire to a welding torch for building metallic objects by solid freeform fabrication.

Another objective of the invention is to provide a method for rapid layered manufacturing of titanium or titanium alloy objects using a metal wire and one or more welding torches. This invention addresses the needs for an improved, economical method of performing direct metal deposition by providing systems and methods for delivery of metal wire to a plasma arc of a welding torch at a desired location with respect to the plasma arc, which can result in an increased rate of deposition of metal in solid freeform fabrication. This invention further addresses the need for a method of increasing throughput and can produce distortion-free direct metal deposition-formed parts with smooth, near net shaped deposition boundaries.

The innovation provides metal wire feeding systems for receiving metal wire from a wire source and feeding the wire to be used in a solid freeform fabrication system. The system includes a cabinet which receives the metal wire from a wire source, a positioning sensor that monitors the position of the wire entering the cabinet from the wire source, a wire-feeding device that advances wire from the wire source into the cabinet to form a loop of slack wire within the cabinet, one or more than one sensor that detects and modulates the amount of slack wire within the cabinet, and a wire-providing device that pulls an amount of the slack wire to provide it to the wire guide to be positioned at a predetermined position relative to the welding torch to be melted onto a surface of the work piece. The welding torch can be of any approrpaie design or configuration. Exemplary welding torches include plasma arc welding torches, plasma transferred arc welding torches, gas tungsten arc welding torches, gas metal arc welding torches, metal inert gas welding torches, metal active gas welding torches, laser devices, electron beam guns and any combination thereof.

The wire feeding systems provided herein can include a control system responsive to the sensor(s) to modulate the supply of additional wire from the wire source into the cabinet thereby modulating the size of the loop of slack wire and thus the amount of slack wire within the cabinet.

Provided herein are metal wire feeding systems that can include a wire supply unit that includes a positionally adjustable wire supply spool; and a cabinet containing a wire tension unit for pulling the metal wire from the wire supply unit into the cabinet; a wire buffer unit that creates a loop of slack wire as a buffer; and a slack wire delivery unit that pulls slack wire from the buffer loop and feeds it out of the cabinet to a contact tip assembly so that the metal wire is fed to the plasma arc of the welding torch of the contact tip assembly.

The cabinet can include an entry wire position detector 110 containing an aperture 120 through which the metal wire 180 can pass; a wire feeding device 200 that includes a motorized grooved roller 220, a passive grooved roller 205, and a motor 225 attached to the grooved roller 220. The grooved rollers 205 and 220 can be equipped with a frictionally enhanced surface. Motorized grooved roller 220 and passive grooved roller 205 together form a passage therebetween through which metal wire 180 passes. Motorized grooved roller 220 and passive grooved roller 205 are in frictional contact with at least a portion of metal wire 180 and the rotation of motorized grooved roller 220 and passive grooved roller 205 feeds the metal wire 180 to the wire buffer unit.

In the metal wire feeding systems provided herein, the entry wire position detector 110 further comprises an array of sensors 122 that can detect a position of the wire 180 within the aperture 120. Exemplary sensors include optical sensors, fiber optic sensors, proximity sensors, photoelectric sensors, magnetic sensors, and combinations thereof. These sensors are commercially available (see, e.g., (Industrial Automation-Omron Corporation, Kyoto, Japan). In some configurations, the entry wire position detector 110 includes an array of fiber optic sensors. The sensor 122 can be in communication with and can provide feedback to a control system that can reposition the wire supply spool in the X-, Y- or Z-direction or combinations thereof. The control system can provide orientation control of the wire supply in response to feedback from sensor 122. The cabinet of the systems provided herein can include a transparent window or transparent door or both to allow viewing of the components in the cabinet without opening the cabinet. The transparent window or door can be made of glass, acrylic (poly(methyl methacrylate) or PMMA), polyethylene terephthalate glycol-modified (PETG), or polycarbonate.

In the metal wire feeding systems provided herein, the wire feeding device 200 can be configured to feed wire from the wire supply spool into the cabinet. A wire tension unit 20 that includes a pressure device 800 can be included to modulate the amount of pressure (perpendicular force) exerted by grooved roller 205 on the wire in the groove of the roller. The pressure device 800 can include a hydraulically, pneumatically, mechanically or electronically driven piston that when extended increases the pressure applied to grooved roller 205, and that when contracted decreases the pressure applied to grooved roller 205. The tension unit 20 that includes a pressure device 800 modulates the amount of wire 180 fed into the cabinet to form a loop of slack wire 185.

The wire buffer unit 30 of the metal wire feeding system can include a combination of at least three wire guides. A first wire guide 300 is positioned after the wire feeding device 200 and in line therewith, a second wire guide 400 positioned to the right of and below wire guide 300, and a third wire guide 500 positioned to the left of and below wire guide 300, where wire guide 300 and wire guide 500 are positioned parallel to each other. The wire guides 300, 400 and 500 form and support a loop of slack wire 185. In some configurations, the loop of slack wire 185 forms an oval shape due to the action of gravity on the unsupported portions of the slack wire 185.

The first wire guide 300 can include a dual grooved roller 305 having a first and second groove, the roller attached to an arm 310 pivotally connected to a back plate 900 of the cabinet; and a dual grooved roller 320 having a first and second groove, where the first groove of roller 305 and the first groove of roller 320 form a channel, and the first groove of roller 305 is biased by a spring on arm 310 connected to a support 330 connected to the back plate 900.

The second wire guide 400 can include a grooved roller 405, the roller attached to an arm 410 pivotally connected to the back plate 900 of the cabinet; and a grooved roller 420, where the groove of roller 405 and the groove of roller 420 form a channel, and the groove of roller 405 is by a spring on arm 410 connected to a support 430 connected to the back plate 900. The third wire guide 500 can include a grooved roller 505, the roller attached to an arm 510 pivotally connected to the back plate 900 of the cabinet; and a grooved roller 520, where the groove of roller 505 and the groove of roller 520 form a channel, and the groove of roller 505 is biased by a spring on arm 510 connected to a support 530 connected to the back plate 900. The wire guides 300, 400, and 500 form a loop pathway from wire guide 300 to wire guide 400 to wire guide 500 and then back to wire guide 300.

The wire buffer unit of the metal wire feeding systems provided herein can include a loop sensing device 700. Loop sensing device 700 can be positioned to detect at least a portion of the loop of slack wire in the cabinet. In some configurations, loop sensing device 700 detects the lower portion of the loop of slack wire. Loop sensing device 700 can include one or more sensors. The loop sensing device 700 can include a sensor 730 in communication with a control system, that when activated the sensor 730 sends a signal to the control system to feed less metal wire 180 into the cabinet. The loop sensing device 700 can include a sensor 720 in communication with a control system, that when activated, the sensor 720 sends a signal to the control system to feed more metal wire 180 into the cabinet. The loop sensing device 700 can include a sensor 740 in communication with a control system, that when activated the sensor 740 sends a signal to the control system to stop feeding metal wire 180 into the cabinet. The loop sensing device 700 can include a sensor 710 in communication with a control system, that when activated the sensor 710 sends a signal to the control system to shut down the wire feeding system. The loop sensing device 700 can include any combination of sensors 710, 720, 730, and 740. Other types or configurations of sensors can be used as loop sensing device 700.

The slack wire delivery unit 40 of the metal feeding system can include a slack wire pulling device 600 comprising a motorized grooved roller 620 and a passive (non-motorized) grooved roller 605 and a motor 625 attached to the grooved roller 620. The grooved rollers 605 and 620 can be equipped with a frictionally enhanced surface. Motorized grooved roller 620 and passive grooved roller 605 together form a passage therebetween through which metal wire 180 passes. Motorized grooved roller 620 and passive grooved roller 605 are in frictional contact with at least a portion of the slack wire 180 and the rotation of motorized grooved roller 620 and passive grooved roller 605 pulls the slack wire 185 and feeds it out of the cabinet via chamber exit guide 1000 to the plasma arc of a welding torch of a contact tip assembly.

In the metal wire feeding systems provided herein, the frictionally enhanced surface of the grooves of rollers 220, 205, 620 and 605 can include protrusions on the surface. The frictionally enhanced surface of the grooves can increase the frictional forces between the grooves and the wire that passes through the grooves. The enhanced frictional forces can decrease slippage between the wire and the grooves. In the metal wire feeding systems provided herein, the motor 225 and the motor 625 each separately can be a direct-current motor driven by a power control signal and a stepper motor.

A slack wire delivery unit 40 that includes a pressure device 850 can be included to modulate the amount of pressure (perpendicular force) exerted by grooved roller 605 on the slack wire in the groove of the roller. The pressure device 850 can include a hydraulically, pneumatically, mechanically or electronically driven piston that when extended increases the pressure applied to grooved roller 605, and that when contracted decreases the pressure applied to grooved roller 605. The motor 225 of the wire feeding device 200 can be connected to the grooved roller 220 to rotate the roller 220. The motor 625 of the slack wire pulling device 600 can be connected to the grooved roller 620 to rotate the roller 620. The motor 225 of the wire feeding device 200 can be configured to operate independently of the slack wire pulling device 600.

Also provided are methods of providing a metal wire to a plasma arc of a welding torch, comprising the steps of advancing a sufficient amount of the metal wire from a wire supply source to form a loop of slack wire; advancing an amount of slack wire from the loop of slack wire to the welding torch; and supplying additional metal wire from the wire supply source to compensate for the amount of slack wire advanced to the welding torch to maintain a loop of slack wire. The amount of slack wire advanced from the wire supply source typically is sufficient to maintain the loop of slack wire to allow for a continuous delivery of slack wire to the welding torch. The wire supply source can be a positionally adjustable spool on which the metal wire is wound, and the method further can include unwinding the metal wire from the spool to provide the metal wire to be advanced to form the loop of slack wire. The method can include as a step repositioning the wire supply spool in the x-, y- or z-direction or combinations thereof to maintain the wire being unwound from the spool in a desired position.

The methods can include as a step rotating a roller in frictional contact with the metal wire to feed the metal wire into the cabinet. The rotating of the roller can be accomplished by activating a motor attached to the roller, where the roller can be attached to the motor's shaft or to a shaft attached to the motor. The motor can be a stepper motor, direct current (DC) motor, brushless DC motor, universal motor, reluctance motor, hysteresis motor, induction motor, synchronous motor, shunt motor, series motor, compounded motor or any combination thereof. Due to the loop of slack wire, which can act as a buffer between the wire tension unit and wire pulling unit, advancing of the metal wire from the supply source can be independent of advancing an amount of slack wire from the loop of slack wire to the plasma arc of the welding torch. The methods also can include rotating a roller in frictional contact with the slack wire to deliver the slack wire to the welding torch. The rotating of the roller can be accomplished by activating a motor attached to the roller, and the motor is a stepper motor or a direct current motor driven by a power control signal.

Provided herein are metal wire feeding systems that can include a cabinet that receives the metal wire 180 from a wire supply spool of a wire supply unit, the cabinet comprising an entry wire position detector 110 containing an aperture 120 through which the metal wire 180 enters the cabinet. A wire tension unit comprising a wire feeding device 200 receives the wire from the wire supply spool, the wire feeding device comprising a motorized grooved roller 220, a passive grooved roller 205 and a motor 225 attached to the grooved roller 220, the wire in frictional communication with at least a portion of the groove of each of the motorized grooved roller 220 and the passive grooved roller 205. The system also includes a wire buffer unit that includes a combination of three or more wire guides that form a loop of slack wire 185 from the metal wire 180. The system also includes a slack wire delivery unit that includes a slack wire pulling device 600 comprising a motorized grooved roller 620, a passive grooved roller 605 and a motor 625 attached to the grooved roller 620, the slack wire 185 in frictional communication with at least a portion of the groove of each of the motorized grooved roller 620 and the passive grooved roller 605, the slack wire pulling device 600 advancing slack metal wire 185 from the loop of slack wire 185 out of the cabinet via a cabinet exit guide 1000 to a plasma arc of a torch welding device.

In the wire buffer unit of the metal wire feeding systems provided herein, the combination of wire guides forming the loop of slack wire can include a first wire guide 300 containing a dual grooved roller 305 having a first and second groove, the roller attached to an arm 310 pivotally connected to a back plate 900 of the cabinet; and a dual grooved roller 320 having a first and second groove, where the first groove of roller 305 and the first groove of roller 320 form a channel and receive the metal wire 180 from the motorized roller 220, and the first groove of roller 305 is biased into engagement with metal wire 180 by a spring on arm 310 connected to a support 330 connected to the back plate 900. The combination of wire guides that forms the loop of slack wire can include a second wire guide 400 positioned to the right of and below wire guide 300 that receives metal wire 180 after it has traversed the channel formed by the first groove of roller 305 and the first groove of roller 320, wire guide 400 containing a grooved roller 405, the roller attached to an arm 410 pivotally connected to the back plate 900 of the cabinet; and a grooved roller 420, where the groove of roller 405 and the groove of roller 420 form a channel and receive the metal wire 180 from the wire guide 300, and the groove of roller 405 is biased into engagement with metal wire 180 by a spring on arm 410 connected to a support 430 connected to the back plate 900. The combination can include a third wire guide 500 positioned to the left of and below wire guide 300 and parallel to wire guide 400, wire guide 500 receiving metal wire 180 after it has traversed the channel formed by the groove of roller 405 and the groove of roller 420, wire guide 500 containing a grooved roller 505, the roller attached to an arm 510 pivotally connected to the back plate 900 of the cabinet; and a grooved roller 520, where the groove of roller 505 and the groove of roller 520 form a channel and receive the metal wire 180 from the wire guide 400, and the groove of roller 505 is biased into engagement with metal wire 180 by a spring on arm 510 connected to a support 530 connected to the back plate 900; the metal wire 180 forming a loop of slack wire 185 between wire guide 400 and wire guide 500 and traversing the channel formed between roller 505 and 520 and advancing through the channel formed between the second groove of roller 305 and the second groove of roller 320.

In the metal wire feeding systems provided herein, the grooves of motorized roller 220 and passive roller 205, separately or in combination, and the grooves of motorized roller 620 and passive roller 605, separately or in combination, can include protrusions to increase the friction between the grooves and the metal wire 180. Any modification of the surface of the groove of the roller that increases the frictional force between the surface of the groove and the metal wire can be used, so long as the friction increasing techniques do not damage the wire surface. The motor 225 and the motor 625 each separately can be selected from among shunt motors, series motors, compounded motors, induction motors, synchronous motors, stepper motors, DC motors, brushless DC motors, universal motors, reluctance motors and hysteresis motors The metal wire feeding system can include an entry wire position detector 110 that can include a sensor 122 that detects the position of wire 180 within the aperture 120. The sensor 122 can be in communication with a control system that can reposition the wire supply spool in any one of the X-, Y- or Z-direction or combinations thereof, controlling the position and orientation of the spool, to maintain a desired position of the metal wire 180 in aperture 120.

In the metal wire feeding systems provided herein, the metal wire 180 can be wound on a wire supply spool and can be advanced into the cabinet via the action of the wire feeding device 200. The metal wire 180 can contain aluminum, iron, cobalt, copper, nickel, carbon, titanium, tantalum, tungsten, niobium, gold, silver, palladium, platinum, zirconium, or an alloy or combination thereof. The metal wire 180 can contain titanium or a titanium alloy containing Ti in combination with one or a combination of Al, V, Sn, Zr, Mo, Nb, Cr, W, Si, and Mn. The metal wire 180 can contain a titanium alloy selected from the group consisting of Ti-6Al-4V, Ti-6Al-6V-2Sn, Ti-6Al-2Sn-4Zr-6Mo, Ti-45Al-2Nb-2Cr, Ti-47Al-2Nb-2Cr, Ti-47Al-2W-0.5Si, Ti-47Al-2Nb-1Mn-0.5W-0.5Mo-0.2Si, and Ti-48Al-2Nb-0.7Cr-0.3Si. The metal wire 180 can have a substantially circular cross section. The metal wire 180 can have a diameter in the range of from about 0.5 mm to about 5 mm.

The metal wire feeding systems provided herein can include a pressure device 800 to modulate the amount of pressure exerted by grooved roller 205 on metal wire 180. The pressure device 800 can include a hydraulically, pneumatically, mechanically or electronically driven piston that when extended increases the pressure applied to grooved roller 205, and that when contracted decreases the pressure applied to grooved roller 205.

The metal wire feeding systems provided herein can include a pressure device 850 to modulate the amount of pressure exerted by grooved roller 605 on metal wire 180. The pressure device 850 can include a hydraulically, pneumatically, mechanically or electronically driven piston that when extended increases the pressure applied to grooved roller 605, and that when contracted decreases the pressure applied to grooved roller 605.

The motor 225 of the wire feeding device 200 can be connected to the grooved roller 220 to rotate the roller 220 while the roller 220 is in frictional contact with metal wire 180 in order to advance metal wire 180. The motor 625 of the slack wire pulling device 600 can be connected to the grooved roller 620 to rotate the roller 620 while in frictional contact with slack wire 185 to pull slack metal wire 185 as a result of the rotation of grooved roller 620. The motor 225 of the wire feeding device 200 can operate independently of the slack wire pulling device 600.

In the metal wire feeding systems provided herein, the combination of three or more wire guides permits the metal wire 180 to bend to form a loop of slack wire 185 from the metal wire 180 in a way that does not result in a permanent deformation in the metal wire 180.

Also provided are methods of providing a metal wire to a plasma arc of a welding torch. The methods include the steps of providing a cabinet to receive the metal wire; feeding a sufficient amount of the metal wire from a wire supply source into the cabinet to form a loop of slack wire; feeding an amount of slack wire from the loop of slack wire to the plasma arc of a welding torch; and supplying additional metal wire from the wire supply source to compensate for the slack wire fed to the plasma arc of the welding torch to maintain a loop of slack wire. The amount of wire supplied from the wire supply source generally is sufficient to maintain the loop of slack wire to allow for a continuous delivery of slack wire to the plasma arc of the welding torch. The loop of slack wire within a cabinet is maintained in the proper position so that the metal wire continuously can be fed to the plasma arc of the welding torch and maintained at a predetermined position within the plasma arc of the welding torch. This secures a stable and reliable wire feed speed, providing for a stable mass input rate in the deposition process. Instability in metal wire supply can lead to unstable deposition, and also can result in burn-back of the wire and stopping production. The loop of slack wire allows the feeding of the metal wire from the wire supply source into the cabinet to be independent of pulling an amount of slack wire from the loop of slack wire to feed to the plasma arc of the welding torch. The loop of slack wire acts as a buffer between the tension unit that feeds metal wire from the supply source into the cabinet and the slack wire pulling unit that pulls slack wire from the loop to feed it to the plasma arc.

The methods can include rotating a roller in frictional contact with the metal wire to deliver the metal wire into the cabinet. Rotating the roller can be accomplished by activating a motor attached to the roller. The motor can be a shunt motor, a series motor, a compounded motor, an induction motor, a synchronous motor, a stepper motor, a DC motor, a brushless DC motor, a universal motor, a reluctance motor or a hysteresis motor. In some configurations, the motor is a stepper motor or a direct current motor driven by a power control signal. The methods can include maintaining a predetermined amount of slack wire within the cabinet to maintain the loop of slack wire by delivery additional metal wire from the wire supply source into the cabinet. The delivering of the metal wire from the supply source into the cabinet can be independent of feeding an amount of slack wire from the loop of slack wire to the plasma arc of the welding torch.

The methods can include rotating a roller in frictional contact with the metal wire to deliver the slack wire to the welding torch. The rotating of the roller can be accomplished by activating a motor attached to the roller. The motor can be any motor, such as a stepper motor or a direct current motor driven by a power control signal. The methods provide metal wire as a consumable electrode to a plasma arc of a welding torch. An exemplary welding torch is a plasma arc welding torch (PAW torch), such as a plasma transferred arc (PTA torch). The PAW torch can be of any configuration capable of creating an electric arc to heat and melt the metal wire, such as gas metal arc welding (GMAW), particularly using non-reactive gases to make the arc (metal inert gas welding or MIG-welding). The metal wire is used as a consumable electrode and is melted inside the plasma arc produced by welding torch using an electric arc, and the melting metal wire is deposited into the molten pool on the workpiece to add to, and to form, the near net shape metallic bodies. The welding torch also can include a laser device, an electron beam gun or combinations thereof.

Also provided are methods for manufacturing a three-dimensional object of a metallic material by solid freeform fabrication, where the object is made by fusing together successive deposits of the metallic material onto a base material, the methods including using a first heating device to preheat the base material at the position at which the metallic material is to be deposited; providing a metal wire to a second heating device to heat and melt the metal wire such that molten metallic material from the melted wire is deposited onto the base material and onto the preheated or molten or partially molten area of the base material if preheating was carried out, and moving the base material relative to the position of the first and second heating devices in a predetermined pattern such that the successive deposits of molten metallic material solidifies and forms the three-dimensional object. The method can utilize a PAW torch, such as a PTA torch, as the first and second device, or a PAW torch as the first heating device and a PAW torch as the second heating device, or a laser as the first heating device and a laser device as the second heating device, or a laser device as a first heating device and an electron beam gun as the second heating device, or an electron beam gun as a first heating device and a laser device as a second heating device, or a first electron beam gun as a first heating device and a second electron beam gun as a second heating device. In systems that include a PTA torch as the PAW torch, the PTA torch can be electrically connected to a direct current power source such that the electrode of the PTA torch becomes the cathode and the metal wire becomes the anode. The methods can utilize a coaxial powder feed nozzle laser system as the first heating device and a laser system as the second heating device. The methods can utilize a first electron beam device as the first heating device and a second electron beam device as the second heating device.

Additional features and advantages of the invention will be set forth in the description which follows, and in part will be apparent from the description, or can be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

A. Definitions

Figure 1:
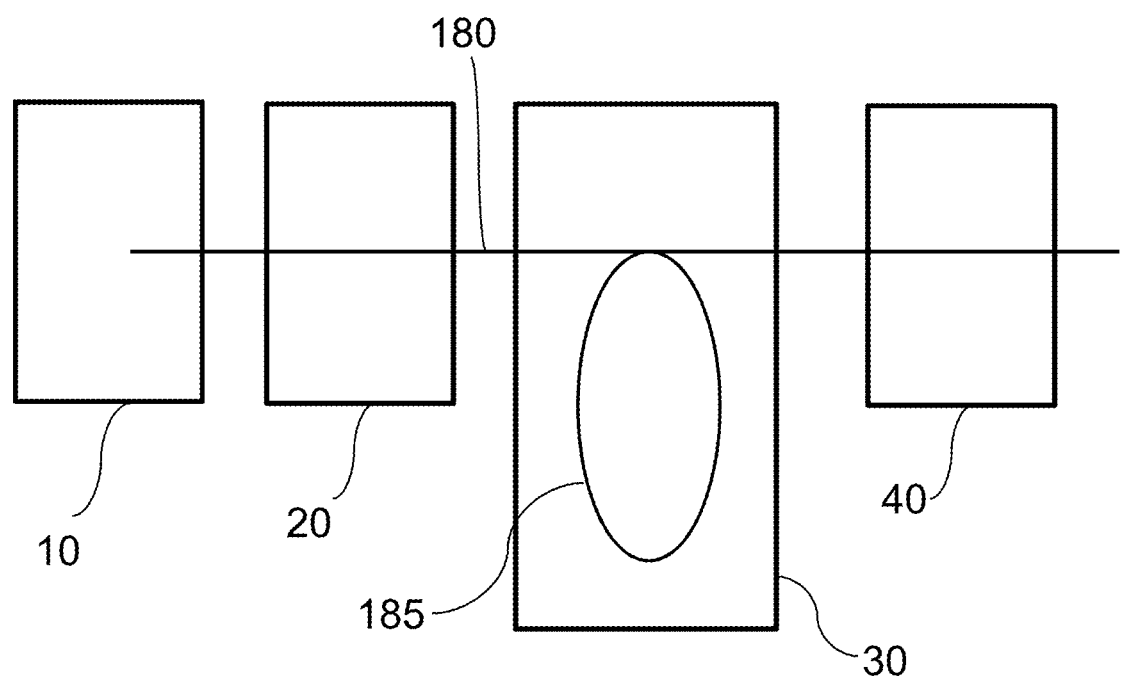
FIG. 1 is a diagram showing components of the metal wire feeder system provided herein. Shown in the diagram are the wire supply unit 10, the wire tension unit 20, the wire buffer unit 30, and the slack wire delivery unit 40. The units interact to move a metal wire from a wire supply source to the plasma arc of a welding torch of a contact tip assembly.

Unless defined otherwise, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety. In the event that there are a plurality of definitions for terms herein, those in this section prevail. Where reference is made to a URL or other such identifier or address, it is understood that such identifiers can change and particular information on the internet can come and go, but equivalent information can be found by searching the internet. Reference thereto evidences the availability and public dissemination of such information.

As used here, the singular forms "a," "an" and "the" include plural referents unless the context clearly dictates otherwise.

As used herein, ranges and amounts can be expressed as "about" a particular value or range. "About" also includes the exact amount. Hence "about 5 percent" means "about 5 percent" and also "5 percent." "About" means within typical experimental error for the application or purpose intended.

As used herein, "optional" or "optionally" means that the subsequently described event or circumstance does or does not occur, and that the description includes instances where the event or circumstance occurs and instances where it does not.

For example, an optional component in a system means that the component may be present or may not be present in the system.

As used herein, a "combination" refers to any association between two items or among more than two items. The association can be spatial or refer to the use of the two or more items for a common purpose.

As used herein, a "Plasma Arc Welding torch" or "PAW torch" refers to a welding torch that can be used in plasma arc welding. The torch is designed so that a gas can be heated to a high temperature to form plasma and becomes electrically conductive, the plasma then transfers an electric arc to a workpiece, and the intense heat of the arc can melt metal and/or fuse two pieces of metal together. A PAW torch can include a nozzle for constricting the arc thereby increasing the power density of the arc. The plasma gas typically is argon. Plasma gas can be fed along the electrode and ionized and accelerated in the vicinity of a cathode. The arc can be directed towards the workpiece and is more stable than a free burning arc (such as in a TIG torch). The PAW torch also typically has an outer nozzle for providing a shielding gas. The shielding gas can be argon, helium or combinations thereof, and the shielding gas assists minimizing oxidation of the molten metal. In a PAW torch, the current typically can be up to about 400 A, and the voltage typically can be between about 25-35 V (but can be up to app. 14 kW). The invention is not tied to any specific choice or type of PAW torch. Any known or conceivable device able to function as PAW torch can be used. An exemplary PAW torch is a plasma transferred arc (PTA) torch.

The term "plasma transferred arc torch" or "PTA torch" as used interchangeably herein refers to any device able to heat and excite a stream of inert gas to plasma by an electric arc discharge and then transfer the flow of plasma gas including the electric arc out through an orifice (such as a nozzle) to form a constricted plume that extends out of the orifice and transfers the intense heat of the arc to a target region. The electrode and target region can be electrically connected to a direct current power source such that the electrode of the PTA torch becomes the cathode and the target region becomes the anode. This will ensure that the plasma plume including electric arc is delivering a highly concentrated heat flow to a small surface area of the target region with excellent control of the areal extension and magnitude of the heat flux being supplied from the PTA torch. A plasma transferred arc has the advantage of providing stable and consistent arcs with little wandering and good tolerance for length deviations between the cathode and anode. Thus, the PTA torch is suitable both for forming a molten pool in the base material and to heat and melt the metallic wire feed. The PTA torch may advantageously have an electrode made of tungsten and a nozzle made of copper. However, the invention is not tied to any specific choice or type of PTA torch. Any known or conceivable device able to function as PTA torch providing a stable heat source for melting the metal electrode wire can be used.

The term "power density" as used herein refers to an amount of power that is distributed to a unit area, e.g., from a plasma arc, laser beam or electron beam.

The term "metallic material" as used herein refers to any known or conceivable metal or metal alloy that may be formed into a wire and employed in a solid freeform fabrication process to form a three-dimensional object. Examples of suitable materials include, but are not limited to; titanium and titanium alloys such as i.e. Ti-6Al-4V alloys.

The term "similar metallic material" as used herein means that the metallic material is of the same metal or metal alloy as the reference metallic material.

The term "holding substrate" as used herein refers to the target substrate upon which additional material, the same or different from that of the holding substrate, is deposited using the technique of SFFF or solid free form fabrication to form a workpiece. In exemplary embodiments, the holding substrate is a flat sheet. In alternative embodiments, the holding substrate may be a forged part. In alternative embodiments, the holding substrate may be an object upon which additional material is to be deposited. In exemplary embodiments, the holding substrate can become part of the workpiece. The material for the holding substrate can be a metal or a metal alloy. In exemplary embodiments, the holding substrate is made of the same metal as the wire feed material.

As used herein, the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The term "base material" as used herein refers to the target material for receiving molten metallic material for forming a three-dimensional object. The base material will be the holding substrate when depositing the first layer of metallic material. When one or more layers of metallic material have been deposited onto the holding substrate, the base material will be the upper layer of deposited metallic material that is to have deposited a new layer of metallic material.

As used herein, "slack wire" refers to that part of the wire that is not held taut or that is not held under tension.

As used herein, "direct metal deposition" refers to the additive layered manufacturing process or 3D printing technology, in which a work piece is produced from a computer-aided design model As used herein, "frictionally enhanced surface" refers to a surface that has been modified to exhibit more friction than an untreated smooth surface of the same material. Modifications to the surface that enhance friction can include roughening the surface, or including protrusions on the surface, or providing a gritted surface. The modified surface can enhance frictional contact (in comparison to a non-modified surface) with the modified surface and another surface, such as a metal wire in contact with the surface, to minimize the slippage between the modified surface and the surface in which it is in contact.

As used herein, the term "work piece" refers to a metal body being produced using solid free form fabrication.

The term "computer assisted design model" or "CAD-model" as used interchangeably herein refers to any known or conceivable virtual three-dimensional representation of the object that is to be formed which may be employed in the control system of the arrangement according to the second aspect of the invention: to regulate the position and movement of the holding substrate and to operate the welding torch with integrated wire feeder such that a physical object is built by fusing successive deposits of the metallic material onto the holding substrate in a pattern which results in building a physical object according to the virtual three-dimensional model of the object. This may, for instance, be obtained by forming a virtual vectorized layered model of the three-dimensional object by first dividing the virtual three-dimensional model into a set of virtual parallel horizontal layers and then dividing each of the parallel layers into a set of virtual quasi one-dimensional pieces. Then, the physical object may be formed by engaging the control system to deposit and fuse a series of quasi one-dimensional pieces of the metallic material feed onto the supporting substrate in a pattern according to the first layer of the virtual vectorized layered model of the object. Then, repeating the sequence for the second layer of the object by depositing and fusing a series of quasi one-dimensional pieces of the weldable material onto the previous deposited layer in a pattern according to the second layer of the virtual vectorized layered model of the object. The deposition continues based on the repetition of the deposition and fusing process layer by layer for each successive layer of the virtual vectorized layered model of the object until the entire object is formed. However, the invention is not tied to any specific CAD-model and/or computer software for running the control system of the arrangement according to the invention, and nor is the invention tied to any specific type of control system. Any known or conceivable control system (CAD-model, computer software, computer hardware and actuators etc.) able to build metallic three-dimensional objects by solid freeform fabrication may be employed as long as the control system is adjusted to separately operate one first PAW torch to pre-heat a surface and/or form the molten pool, and a second PAW torch to melt the feed wire of metallic material into the molten pool.

B. Metal Wire Feeding System

It has been determined that the deposition rate of molten metal to a forming work piece being manufactured using direct metal deposition (e.g., additive manufacturing) can be increased using a metal wire feeding system that maintains as a buffer an amount of slack wire within a cabinet in the proper position so that the metal wire continuously can be fed to the plasma arc of a welding torch of a contact tip assembly. A diagram of a representative metal wire feeding system is shown in FIG. 1. The system includes a wire supply unit 10, a wire tension unit 20, a wire buffer unit 30 and a slack wire delivery unit 40. Although the units are shown diagrammatically as being separated from each other, two or more or all of the units can be contained within a single structure, such as a chamber or housing.

Figure 2:
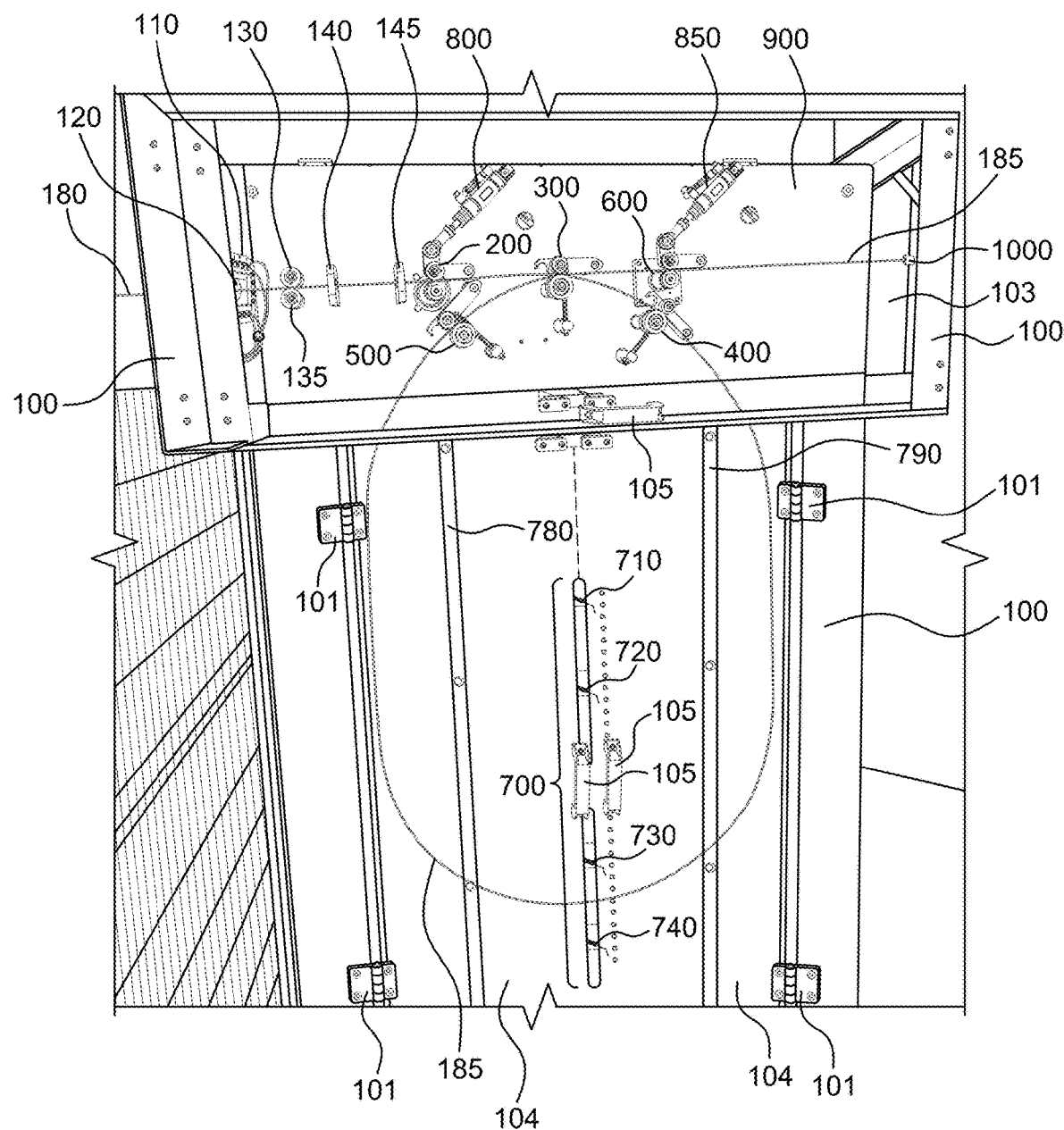
FIG. 2 is a schematic front view of an embodiment of the metal wire feeder system provided herein showing the loop of slack wire within the cabinet. The loop of slack wire acts as a wire buffer that separates the wire feeding system that feeds wire from a supply spool from the slack wire pulling device that feeds slack wire to a plasma arc or a welding torch.

A more complete appreciation of the present invention and its scope can be obtained from the accompanying drawings, which are briefly summarized below, from the following detailed descriptions of presently preferred embodiments of the invention, and from the appended claims. A schematic view of a portion of an exemplary metal wire feeding system, which does not depict the wire supply unit, is shown in FIG. 2.

Figure 3:
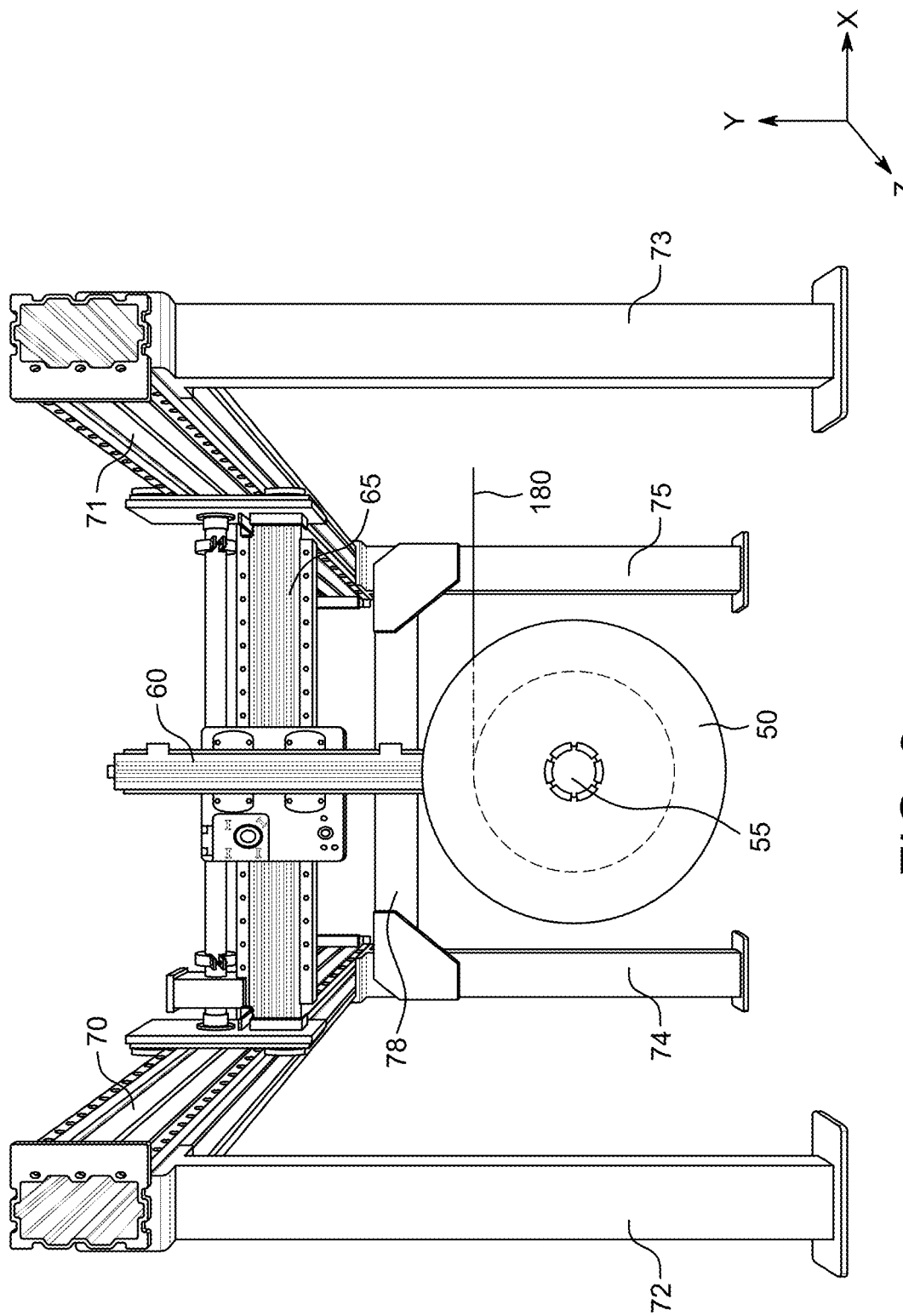
FIG. 3 is a schematic front skewed view showing the components of an exemplary wire supply unit.

The components of an exemplary wire supply unit 10 are shown in FIG. 3. The wire supply unit 10 contains components that allow metal wire 180 to be provided to the wire tension unit 20. As shown in FIG. 3, the metal wire 180 can provided to the wire feed system from a metal wire supply spool 50. The wire supply spool 50 can be mounted for rotation about a pivot 55 on a vertical support element 60 that is movably connected to a traverse support element 65 which is movably connected to a first lateral support 70 and a second lateral support 71. Pivot 55 is movably connected to a vertical support element 60 to allow pivot 55 and the wire supply spool 50 to move vertically (up and down relative to the ground) about the Y axis, allowing the supply spool 50 to be raised or lowered relative to the floor. This allows the metal wire 180 coming off of the supply spool 50 to be maintained at the same height as the entry aperture into the cabinet containing the wire tension unit, the wire buffer unit, and the slack wire delivery unit.

The vertical support element 60 can include a hydraulic, pneumatic, mechanical or electric lifting system to adjust the vertical position of pivot 55 to modulate the vertical position of the metal wire supply spool 50. A motorized track system is depicted in FIG. 3, but any lifting system can be used. Changes in the vertical positioning of metal wire supply spool 50 allows the metal wire 180 de-spooling from the supply spool 50 to be maintained substantially at the same height as the wire is removed from the spool, which addresses the decreasing diameter of the wire spooled onto the supply spool 50 as wire is unwound from the spool.

The vertical support element 60 is movably connected to a traverse support element 65 to allow vertical support element 60 to move horizontally (to the left and right when viewed from the perspective depicted in FIG. 3) about the X axis. This allows the wire supply spool 50 to be repositioned closer to or further away from the cabinet of the wire feed system. The traverse support element 65 can include a hydraulic, pneumatic, mechanical or electric system to adjust the position of vertical support element 60 to modulate the horizontal position of the metal wire supply spool 50. A motorized track system is depicted in FIG. 3, but any repositioning system can be used to adjust the position of vertical support element 60.

The traverse support element 65 is movably attached to lateral support elements 70 and 71, which allows the traverse support element 65 to move forward and backward (toward and away when viewed from the perspective depicted in FIG. 3) about the Z axis. This allows the metal wire 180 de-spooling from the metal wire supply spool 50 to be repositioned in order to maintain the metal wire 180 substantially within the center of aperture 120 of sensing device 110 (shown in detail in FIG. 7) as the wire unwinds from supply spool 50. Each of lateral support elements 70 and 71 can include a hydraulic, pneumatic, mechanical or electric system to adjust the position of traverse support element 65 to modulate the position of the metal wire supply spool 50. A motorized track system is depicted in FIG. 3, but any repositioning system can be used to adjust the position of traverse support element 65.

Lateral support 70 can be attached to front mounting support 72 and rear mounting support 74, which can be removably fixed to the ground, such a via bolts and nuts through a mounting plate. Lateral support 71 can be attached to front mounting support 73 and rear mounting support 75, which can be removably fixed to the ground, such a via bolts and nuts through a mounting plate. Front mounting supports 72 and 73 or rear mounting supports 74 and 75 can be attached to each other using a crossbeam. FIG. 2 depicts rear mounting supports 74 and 75 attached to each other using a crossbeam 78.

A control system (not shown) can receive signals from the sensing device 110 (shown in FIGS. 2 and 4 and partially in FIG. 5) of the wire feed system to reposition the metal wire supply spool in the X-, Y- or Z-direction in order to maintain the desired positioning of the metal wire 180 as it enters the cabinet through entry aperture 120. The control system can include a computer processer or central processing unit (CPU), CPU display, one or more power supplies, power supply connections, signal modules as inputs and/or outputs, integrated shielding of analog signals, storage devices, circuit boards, memory chips or other storage medium, a non-transitory computer-readable storage medium having a computer-readable program embodied therein, or any combination thereof. The computer-readable program can contain appropriate software for partially or completely automating any one or combination of systems. The computer-readable program can contain appropriate software for monitoring and/or adjusting a parameter. Exemplary parameters include the status of one or more of the sensors, tension of the metal wire, rate at which the metal wire passes a target position, amount of metal wire remaining on the wire supply spool, or any combination thereof. Exemplary control systems include, but are not limited to, the SIMATIC-S7-1500 from Siemens AG (Munich, Germany), the IndraMotion MTX system available from Bosch Rexroth AG (Lohr am Main, Germany), and the SIGMATEK C-IPC compact industrial computer system available from SIGMATEK GmbH & Co. KG (Lamprechtshausen, Austria).

The control system can include a computer capable of running a program that can direct the activation of the repositioning mechanisms of any one or combination of the vertical position of pivot 55, the position of vertical support element 60, and the position of traverse support element 65 in the necessary direction(s) to maintain the metal wire 180 substantially in the center of aperture 120 of the cabinet containing the wire feeding device 200, the wire buffer unit including a series of three wire guides 300, 400, and 500, used to form the loop of slack wire 185, and slack wire pulling device 600, which pulls the slack wire 185 and feeds it out of the cabinet via chamber exit guide 1000 (see FIG. 2).

It has been determined that the deposition rate of molten metal to a forming work piece can be increased using a metal wire feeding system that maintains an amount of slack wire within a cabinet in the proper position so that the metal wire continuously can be fed to the plasma arc of a welding torch and maintained at a predetermined position within the plasma arc of the welding torch. The loop of slack wire can act as a buffer to maintain a stable and reliable wire feed speed, securing a stable mass input rate for the production process. Instabilities may not only lead to unstable deposition, but also to burn-back of wire and halting of production. The loop of slack wire can minimize instabilities in wire speed, tension or position. The wire feed speed can be maintained substantially constant so that metal wire is continuously being fed to the plasma arc of the welding torch to be melted onto a work piece. The continuous feed of metal wire to the welding torch prevents a non-smooth or discontinuous deposition of metal to the work piece. Any unintentional discontinuity of deposition can result in imperfections, irregularities, and flaws in the work piece, which ultimately could lead to delamination, fatigue or cracking of the final product, potentially rendering it unusable for its intended purpose. Increasing the rate of continuous feed of metal wire also allows the rate of deposition of melted metal to the work piece to increase, increasing the efficiency of the freeform fabrication process.

Referring to FIG. 1, the wire tension unit 20 can be controlled independently from the slack wire delivery unit 40. Accordingly, metal wire can be fed into the cabinet from a wire supply unit 10 by action of the wire tension unit 20 at a rate that can be different from, or substantially the same as, the rate at which the slack wire is provided to the plasma arc of the welding torch outside the wire feed cabinet by the action of the slack wire delivery unit 40. With this arrangement, the amount of wire fed into the cabinet by the action of wire tension unit 20 can be independent of the amount of slack wire pulled by the slack wire delivery unit to feed to the plasma arc of the welding torch.

In general, the metal wire can be provided on a supply spool upon which the metal wire is wound. In order to provide the metal wire to the cabinet, the entire mass of wire wound on the supply spool needs to be rotated. The mass and inertia effects of removing the wire from the wire supply spool by the tension unit can be isolated from the wire provided the welding torch by the loop of slack wire within the cabinet. Because the mass and inertia effects of removing the wire from the wire source spool are isolated from the wire being delivered to the welding torch, wire slippage within the cabinet is minimized. In addition, any inertial effects from the wire supply spool that could result in wire being pulled back toward the wire supply spool would be eliminated by the loop of slack wire, thereby making it possible to deliver a continuous supply of metal wire to the plasma arc of the welding torch, minimizing any unwanted discontinuous deposition of melted metal onto the work piece. Because a continuous supply of metal wire is provided to the plasma arc of the welding torch, the deposition process can be maintained smoothly and continuously.

Figure 4:
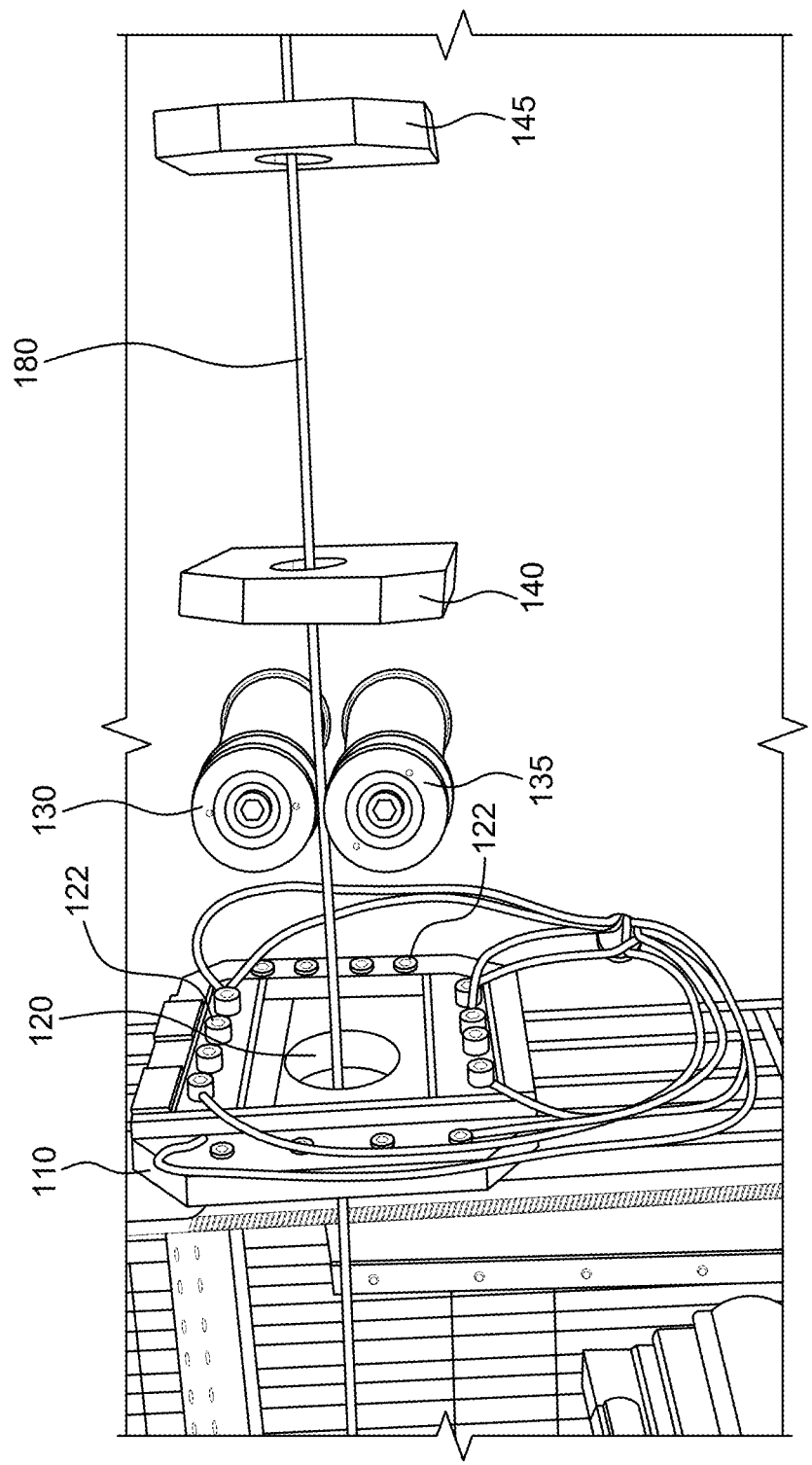
FIG. 4 is a schematic close up view of an embodiment of the metal wire feeder system provided herein showing entry of the metal wire 180 into the cabinet via the entry wire position detector 110 and a wire receiving unit that includes first receiving wheel 130 and second receiving wheel 135.
Figure 5:
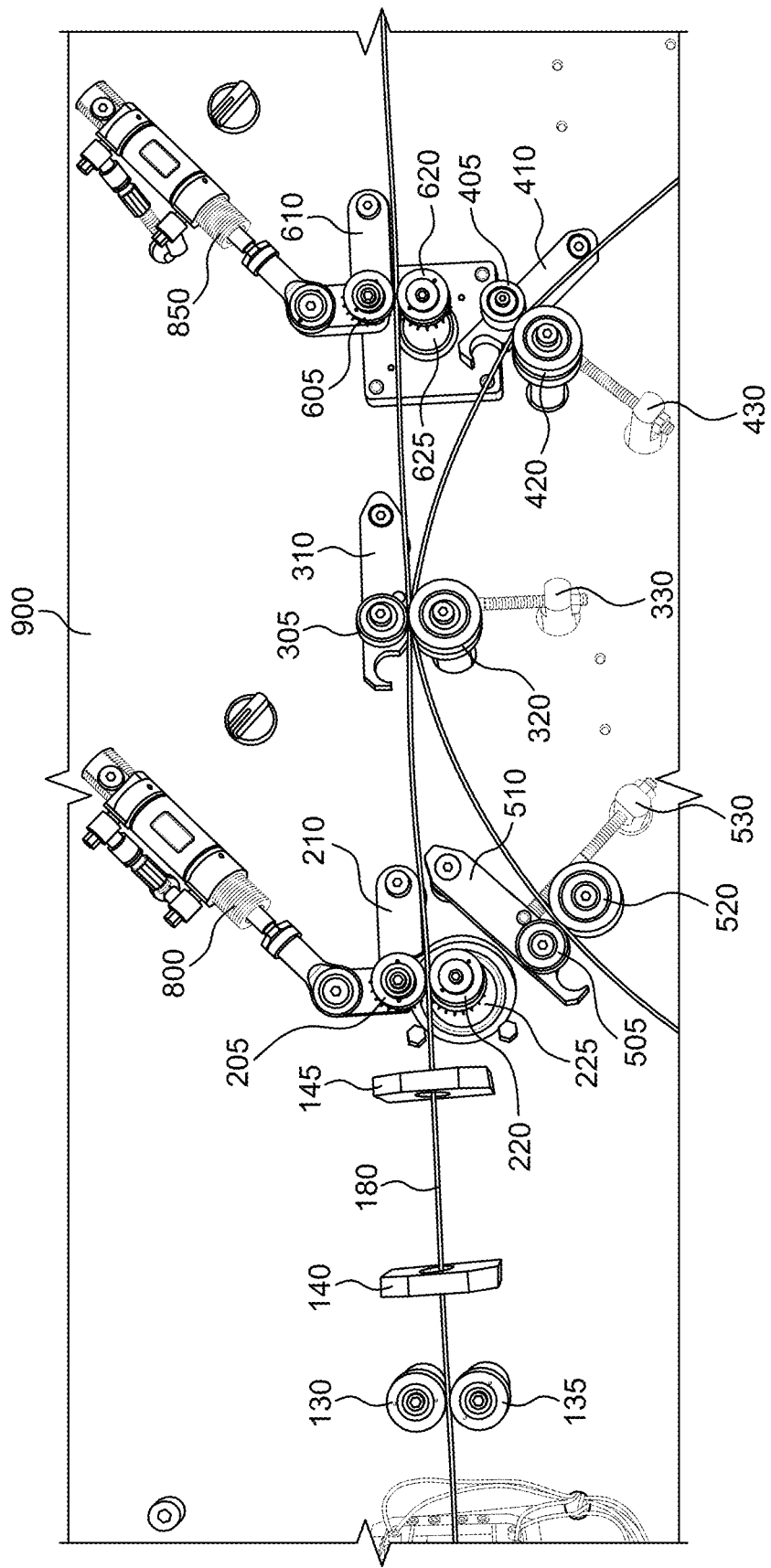
FIG. 5 is a schematic close up view of an embodiment of the metal wire system provided herein showing the tension unit that includes pressure device 800 that feeds wire from the wire source into the cabinet, a combination of wire guides that form and maintain an amount of slack wire within the cabinet, and a slack wire pulling unit that includes pressure device 850 that pulls an amount of the slack wire to feed it to the plasma arc of the welding torch.

The metal wire can be fed from the wire supply unit 10 into the cabinet using wire tension unit 20. As shown in FIGS. 2, 4 and 5, the wire feed system can include a sensing device 110 containing an aperture 120 through which a metal wire 180 from the wire supply spool 50 can be fed into the cabinet. The metal wire 180 can be maintained substantially in the center of aperture 120 via a tensional force exerted by wire feeding device 200. As depicted in FIG. 4, metal wire 180 can enter the cabinet via aperture 120 in sensing device 110 and can travel through a wire receiving unit containing a passive receiving wheel 130 and a passive receiving wheel 135, that together for a channel therebetween through which the metal wire 180 can pass. The receiving wheel 130 or receiving wheel 135 optionally can be biased by a spring into engagement with the metal wire 180. Referring to FIG. 5, the metal wire 180 can be advanced through optional brackets 140 and 145 by the pulling force exerted on metal wire 180 between passive grooved roller 205 and motorized grooved roller 220. Brackets 140 and 145 can be used as mounting platforms for other devices. For example, a camera for observing the metal wire 180 as it enters the cabinet can be mounted to bracket 140. A brush for removing any loose material or debris can be mounted to bracket 145. In some configurations, brackets 140 and 145 are omitted.

Referring to FIG. 2, the cabinet can include a back plate 900 that defines the back portion of the cabinet. Attached to the back plate 900 is a frame 100, to which are attached side walls defining the lateral outside edges of the cabinet (not shown in the figure). A ceiling and a floor optionally can be connected to the side walls (not shown in the figure) and when present can define the top and bottom of the cabinet, respectively. An upper transparent window 103 can be connected to the frame 100 via hinges (not shown), and two lower transparent doors 104 are connected to the frame 100 via hinges 101. The transparent window 103 and the two lower transparent doors 104 make up the front of the cabinet. The window and doors can be made of any material, such as glass, acrylic (polymethylmethacrylate or PMMA), polyethylene terephthalate glycol-modified (PETG), or polycarbonate. The transparent window and doors allow visualization of the metal wire feeding system without the need to open the cabinets' window or doors. Sensors 122 can be positioned around aperture 120 to determine the position of the metal wire 180 as it moves within aperture 120 into the cabinet. The sensors 122 can send information to a control system (not shown) that can reposition the metal wire supply spool in the X-, Y- and/or Z-direction in order to maintain the desired positioning of the metal wire 180 as it enters the cabinet through aperture 120. Exemplary sensors include optical sensors, fiber optic sensors, proximity sensors, photoelectric sensors, magnetic sensors, and combinations thereof. These sensors are commercially available (see, e.g., (Industrial Automation-Omron Corporation, Kyoto, Japan). In some configurations, an array of fiber optic sensors can be positioned around aperture 120.

Still referring to FIG. 2, a cabinet exit guide 1000 can direct the metal wire 180 out of the cabinet and into the wire guide of the plasma arc welding torch. The cabinet exit guide 1000 can be positioned in the side wall of the cabinet directly in line with the sensing device 110 and parallel thereto so that a straight line would result if the aperture 120 of sensing device 110 and the cabinet exit guide 1000 were connected. The cabinet protects the wire from accidental contact and prohibits the metal wire 180 from being touched with bare hands. This can minimize contamination of the wire, which is desirable because wire contamination could cause imperfections in the deposited work product. The cabinet can include one or more sensors that monitor the state of window 102 and/or doors 104. The control system can be programmed so that the deposition process stops whenever window 102 and/or one of doors 104 is open. Exemplary sensors include electric contact sensors, optical sensors, proximity sensors, photoelectric sensors, magnetic sensors, and combinations thereof. For example, a cylindrical proximity sensor (Industrial Automation-Omron Corporation, Kyoto, Japan) can be used on the window or doors or both.

An exemplary wire tension unit includes a wire feeding device that can include a motorized roller that makes frictional contact with the wire being fed from the wire supply spool. A motor can rotate the roller to feed metal wire into the cabinet. Any type of motor can be used. Exemplary motors include shunt motors, series motors, compounded motors, induction motors, synchronous motors, stepper motors, DC motors, brushless DC motors, universal motors, reluctance motors and hysteresis motors. The motor driving the wire-supplying roller can be a conventional DC motor which is driven by a power control signal. The power control signal can have a repeating duty cycle characteristic defining an on-time during which power is supplied and an off-time during which power is not supplied. The motor can be directly attached to the roller, or the roller can be attached to the motor's shaft or to a shaft attached to the motor. A speed reducing gear head can be used to connect the motor to the roller. Using a power control signal with a duty cycle characteristic to run the motor allows precise control over advancing the wire because of the ability to control and avoid rotational inertia or wind-down effects. Consequently, an excessive amount of additional wire is not supplied into the cabinet, but only a sufficient amount is brought into the cabinet to maintain a desired amount of slack wire. The motor driving the wire-supplying roller can be a stepper motor that allows a precise amount of wire to be advanced from the wire supply spool into the cabinet by electronically controlling the number of power pulses supplied to the drive motor.

Figure 6:
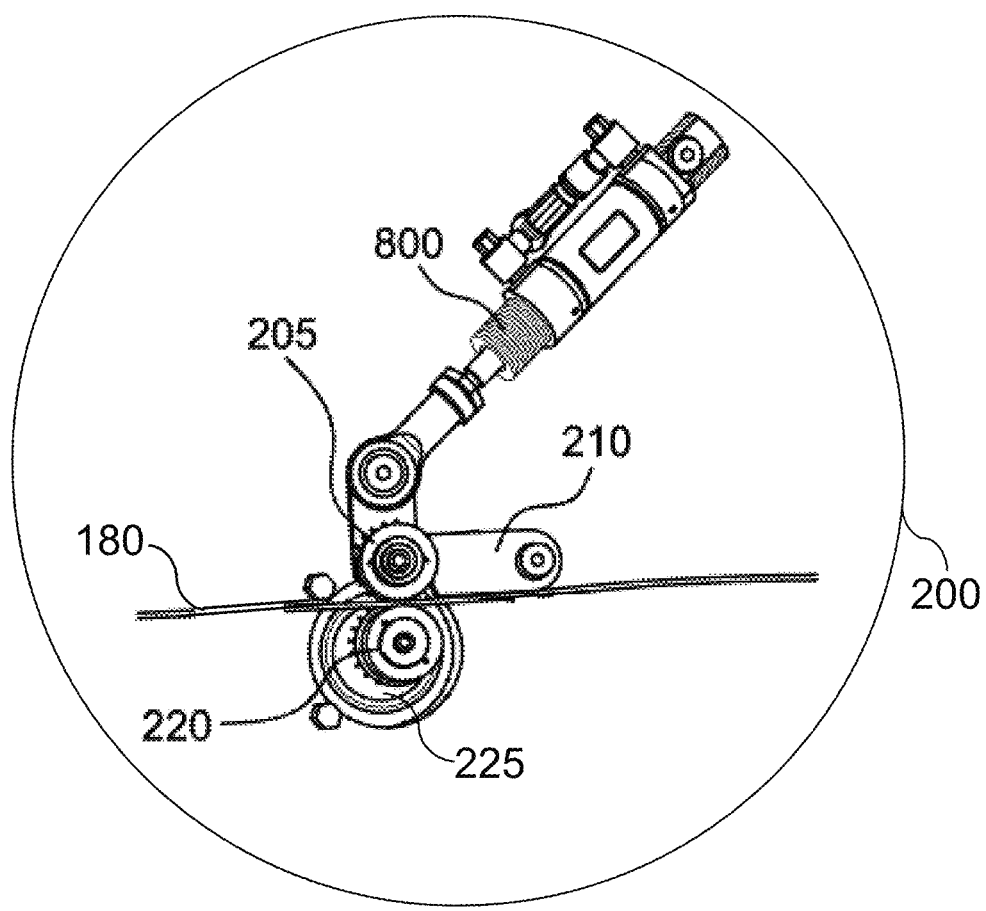
FIG. 6 is a schematic close up view of an exemplary wire feeding device 200.

An exemplary wire feeding device 200 is depicted in FIG. 6. The metal wire 180 from the supply spool 50 (shown in FIG. 3) is fed into the cabinet by the action of the wire feeding device 200 that includes a motorized grooved roller 220 attached to a motor 225 and a passive grooved roller 205. The motor 225 can be any motor, such as a conventional direct-current (DC) motor driven by a power control signal, or can be a stepper motor that allows a precise amount of wire to be advanced from the wire supply spool into the cabinet by electronically controlling the number of electric command pulses supplied to the drive motor. The metal wire 180 is directed to a position between the groove of motorized grooved roller 220 attached to motor 225 and the groove of passive grooved roller 205. Grooved roller 205 and grooved roller 220 can include protrusions in the groove that can engage with the metal wire 180 and pull the metal wire 180 through the groove between the rollers. The protrusions in the groove can increase the frictional forces between the roller groove and the metal wire 180 allowing the rollers to frictionally engage with metal wire 180 and advance it through the roller.

Passive grooved roller 205 and motorized grooved roller 220 typically are made of steel, but can be made of other alloys, such as Inconel® nickel-chromium alloy, Monel® nickel-copper alloy or ToughMet® copper-nickel-tin alloys. When the roller is made of or contains steel, the steel can be a carbon steel or stainless steel. Exemplary steels include S355, S355JR, S355J2, S355J2+N, and S450J0. Grooved rollers are commercially available (e.g., from Products for Industry, Inc., Brighton, CO, USA, and SBI International, Hollabrun, Austria).

The amount of perpendicular pressure exerted by passive grooved roller 205 on metal wire 180 can be adjusted by the selection of the configuration of the groove in the grooved roller 205 as well as the pressure exerted by pressure device 800. The roller can have a V-groove, a U-groove, a tapered groove, a cylindrical groove, a 60° groove, a 90° groove, or a sheave type groove. Increasing the pressure exerted by pressure device 800 increases the pinch pressure exerted by grooved roller 205 on the wire. If too little pressure is exerted by pressure device 800, slippage of metal wire 180 from between grooved roller 205 and grooved roller 220 can occur. If too much pressure is exerted by pressure device 800, deformation of metal wire 180 can occur. A pressure up to 3 bars can be applied by pressure device 800. The pressure device 800 can include a hydraulically, pneumatically, mechanically or electronically driven piston that when extended increases the pressure applied to grooved roller 205, and when contracted decreases the pressure applied to grooved roller 205. The action of motor 225 creates tension on the metal wire 180 between the motorized grooved roller 220 and wire supply spool 50. The metal wire 180 can be maintained substantially in the center of aperture 120 via this tensional force.

Figure 7:
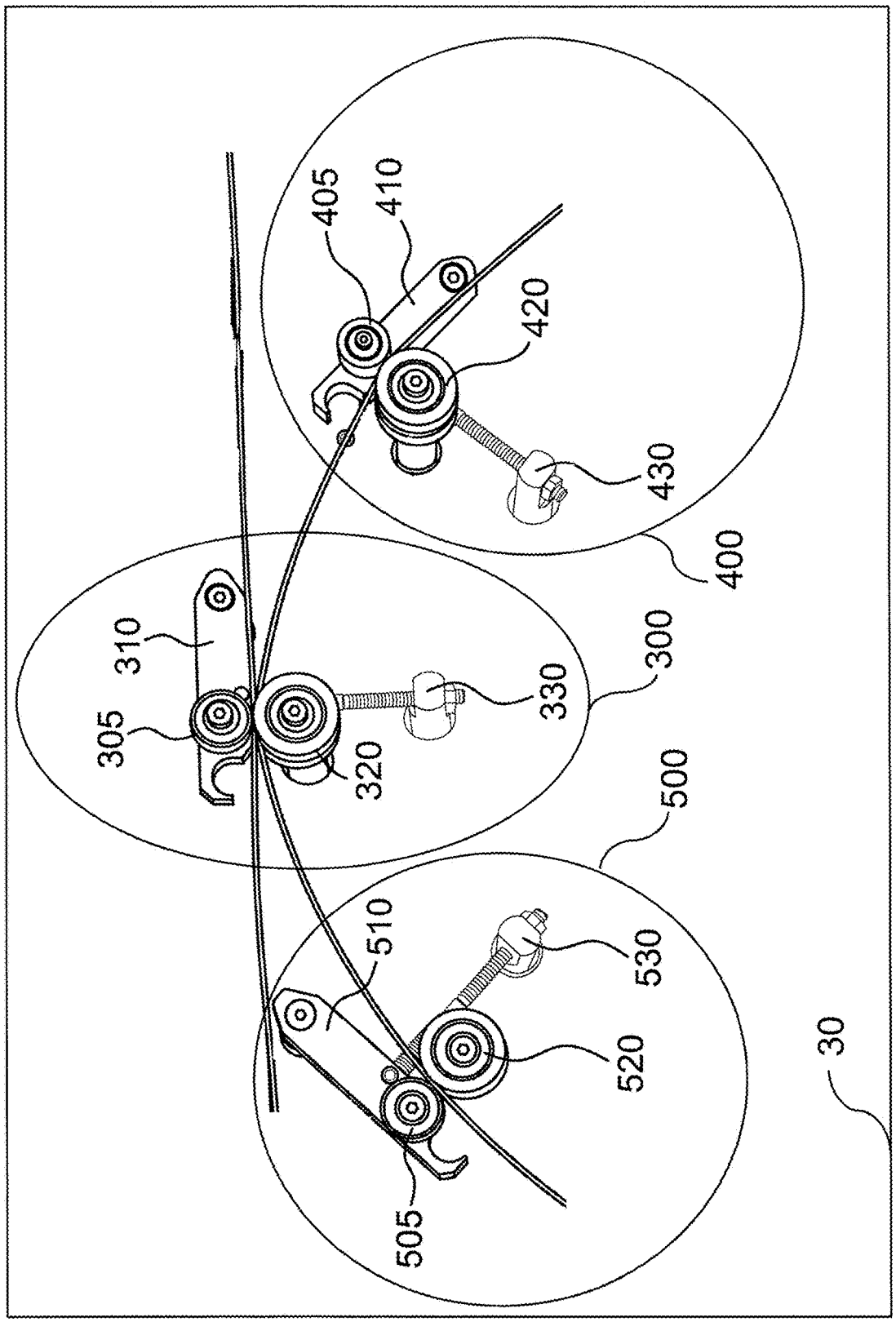
FIG. 7 is a schematic close up view of an exemplary wire buffer unit 30 that includes a series of three wire guides 300, 400, and 500, which form a loop of slack wire.
Figure 8:
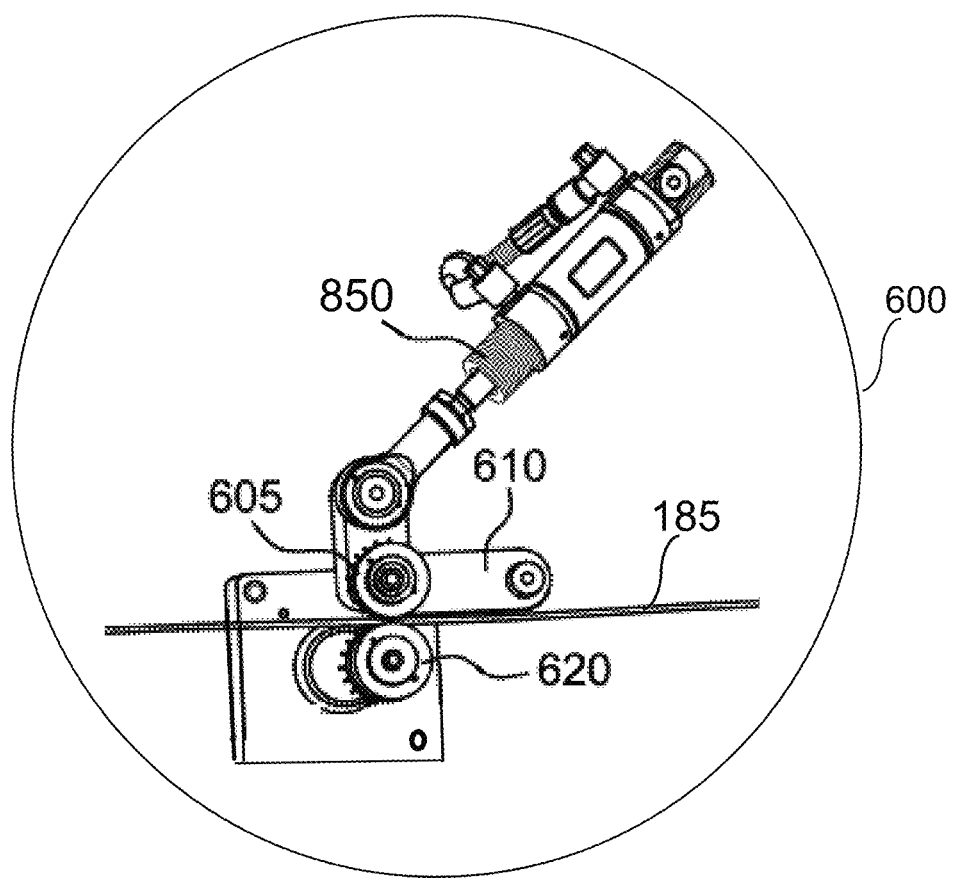
FIG. 8 is a schematic close up of an exemplary slack wire pulling device 600.

After passing through the passage created between passive grooved roller 205 and motorized grooved roller 220, the metal wire 180 travels to the wire buffer unit 30, which includes a combination of wire guides containing passive grooved rollers to form a loop of slack wire 185 within the cabinet. An exemplary configuration of wire guides for the wire buffer unit 30 is depicted in FIG. 7. In the configuration depicted in FIG. 7, a series of three passive wire guides 300, 400, and 500, is used to form the loop of slack wire. The grooved rollers of the wire guides 300, 400, and 500 are smooth, and typically made of steel. The steel can be a carbon steel or a stainless steel. Exemplary steels include S355, S355JR, S355J2, S355J2+N, and S450J0. After leaving motorized grooved roller 220, the metal wire 180 enters a first groove of a dual grooved wire guide 300 containing a dual grooved roller 305 and dual grooved roller 320. Roller 305 can be attached to an arm 310, which can be pivotally connected to back plate 900 so that arm 310 can passively rotate about the axis of connection in a plane parallel to back plate 900. Roller 305 can be biased by a spring connected to support 330 into engagement with metal wire 180.

Metal wire 180 is guided through the channel formed between roller 305 and 320 of wire guide 300 and travels toward a wire guide 400 positioned to the right of and below dual groove roller 320 of wire guide 300. The wire guide 400 can contain a grooved roller 405 and grooved roller 420. Roller 405 can be attached to an arm 410, which can be pivotally connected to back plate 900 so that arm 410 can passively rotate about the axis of connection in a plane parallel to back plate 900. Roller 405 can be biased by a spring connected to support 430 into engagement with metal wire 180.

Metal wire 180 is guided through the channel formed between rollers 405 and 420 of wire guide 400 and forms a loop of slack wire as it travels toward wire guide 500, which is positioned to the left of and below dual groove roller 320, as depicted in FIG. 2. The wire guide 500 contains a grooved roller 505 and grooved roller 520. Roller 505 can be attached to arm 510, which can be pivotally connected to back plate 900 so that arm 510 can passively rotate about the axis of connection in a plane parallel to back plate 900. Roller 505 can be biased by a spring connected to support 530 into engagement with metal wire 180. Metal wire 180 between wire guides 400 and 500 forms a single loop of slack wire 185. The loop of slack wire 185 can form an oval shape due to the effects of gravity on the unsupported metal wire between wire guides 400 and 500.

The more slack wire that is allowed to enter the cabinet, the larger the single loop of slack wire 185 becomes. The loop of slack wire 185 acts as a buffer to make sure that there is sufficient metal wire 180 in the correct orientation to keep up with the demands of the deposition process. When the deposition process is being performed at higher speeds, more metal wire 180 can be allowed into the cabinet and the loop of slack wire 185 can be relatively large such that it can occupy a large portion of the cabinet. When the deposition process is being performed at a slower speed, less slack wire is required and thus less metal wire 180 can be allowed into the cabinet and the loop of slack wire 185 can be smaller such that it occupies a smaller portion of the cabinet.

The metal wire feeding system provided herein can include a loop sensing device 700 that can detect the presence of the loop of slack wire in the cabinet. An exemplary loop sensing device can include a plurality of sensors, as shown in FIG. 2. As depicted in FIG. 2, loop sensing device 700 includes sensors 710, 720, 730 and 740 that can be used to determine the amount of slack wire within the cabinet. The sensors can be in communication with a control system responsive to the feedback received from the sensors. Each sensor separately can send a signal to the control system when metal wire 180 is sensed by the sensor. In response to the signal from the sensor, the control system can modulate the supply of additional wire being drawn from the wire source into the cabinet thereby regulating the size of the loop of slack wire and thus the amount of slack wire within the cabinet. Exemplary sensors include optical sensors, fiber optic sensors, proximity sensors, photoelectric sensors, magnetic sensors, and combinations thereof. These sensors are commercially available (see, e.g., (Industrial Automation-Omron Corporation, Kyoto, Japan). In some configurations, the sensors 710, 720, 730 and 740 are fiber optic sensors or proximity sensors, which does not require contact with the slack wire.

For example, in the exemplified embodiment shown in FIG. 2, as additional metal wire 180 is brought into the cabinet via the actions of wire feeding device 200, the bottom of the loop of slack wire 185 begins to descend. Due to the positioning of wire guides 300, 400, and 500, and the effect of gravity on the unsupported slack wire, the loop of slack wire 185 generally has an oval shape. When the bottom of the loop of slack wire 185 is in the proximity of sensor 720, sensor 720 sends a signal to the control system. The control system is pre-programmed to feed more wire into the cabinet in response to the signal from sensor 720. As more metal wire 180 is fed into the cabinet, the lower portion of the loop of slack wire descends. When the bottom of the loop of slack wire 185 is in the proximity of sensor 730, sensor 730 sends a signal to the control system. The control system is pre-programmed to feed less wire into the cabinet in response to the signal from sensor 730. The interaction between the bottom of the loop of slack wire 185 and sensors 720 and 730 can result in a substantially constant supply of slack wire within the cabinet to supply the plasma arc of the welding torch during the deposition process.

In the event the deposition process slows considerably, the bottom of the loop of slack wire 185 descends toward the floor of the cabinet and comes into proximity of and is detected by sensor 740. In order to prevent an excess of slack wire from collecting in the cabinet, which could get entangled with itself or otherwise encumber easy passage of wire through the system, the control system can be programmed that when it receives a signal from sensor 740, motor 225 is stopped to stop additional metal wire 180 from entering the cabinet.

In the event the deposition process accelerates considerably, or if the wire feed supply cannot keep up with the demand for metal wire 180, the bottom of the loop of slack wire 185 ascends toward the top of the cabinet, first coming into proximity with sensor 720. If sufficient metal wire is not brought into the cabinet in response to the signal from sensor 720 to the control system, and the bottom of the loop of slack wire 185 continues its upward ascent. The loop eventually will come into proximity with and be detected by sensor 710. Sensor 710 sends a signal to the control system, which can be programmed to shut down the entire system, including motors 225 and 625 and the plasma arc welding torch, halting the deposition process, when it receives a signal from sensor 710. The shutdown minimizes risk of damage to the equipment.

After slack wire 185 leaves the rollers of wire guide 500, slack wire 185 is guided through the channel between the second groove of dual grooved roller 305 and the second groove of dual grooved roller 320 of wire guide 300 and travels toward a slack wire pulling device 600, containing a motor 625 connected to a motorized grooved roller 620, and a passive grooved roller 605.

The motor 625 can be any motor, such as a conventional direct-current (DC) motor driven by a power control signal, or a stepper motor that allows a precise amount of wire to be advanced from the wire supply spool into the cabinet by electronically controlling the number of input electric pulses supplied to the drive motor. The slack wire 185 is directed to a position between the motorized grooved roller 620 attached to motor 625 and passive grooved roller 605. Passive grooved roller 605 or motorized grooved roller 620 or both can include protrusions in the groove that can engage with the slack wire 185 and advance slack wire 185 through the rollers. The protrusions in the groove can increase the frictional forces between the roller groove and the slack wire 185 allowing the rollers to frictionally engage with slack wire 185 and pull it through the rollers.

Passive grooved roller 605 and motorized grooved roller 620 typically are made of steel, but can be made of other alloys, such as Inconel® nickel-chromium alloy, Monel® nickel-copper alloy or ToughMet® copper-nickel-tin alloys. When the rollers are made of or contain steel, the steel can be a carbon steel or stainless steel. Exemplary steels include S355, S355JR, S355J2, S355J2+N, and S450J0. Grooved rollers are commercially available (e.g., from Products for Industry, Inc., Brighton, CO, USA, and SBI International, Hollabrun, Austria).

The amount of perpendicular pressure exerted by passive grooved roller 605 on slack wire 185 can be adjusted by the selection of the configuration of the groove in the grooved roller 605 as well as the pressure exerted by pressure device 850. The roller can have a V-groove, a U-groove, a tapered groove, a cylindrical groove, a 60° groove, a 90° groove, or a sheave type groove. Increasing the pressure exerted by pressure device 850 increases the pinch pressure exerted by grooved roller 605 on the wire. If too little pressure is exerted by pressure device 850, slippage of slack wire 185 from between grooved roller 605 and motorized grooved roller 620 can occur. If too much pressure is exerted by pressure device 850, deformation of metal wire 180 can occur. A pressure up to 3 bars can be applied by pressure device 800.

The pressure device 850 can include a hydraulically, pneumatically, mechanically or electronically driven piston that when extended increases the pressure applied to passive grooved roller 605, and when contracted decreases the pressure applied to passive grooved roller 605. The action of motor 625 pulls the wire, resulting in a reduction in the size of the loop of slack wire 185. Motors 225 and 625 can be separately operated and their individual actions can adjust the amount of slack wire within the cabinet and the size of the loop of slack wire 185. After passing through grooved roller 605 and motorized grooved roller 620, the slack wire 185 travels through cabinet exit guide 1000 and is delivered to the wire guide of the plasma arc welding torch device.

The motor 625 can be in communication with the welding device, which can send a signal to the motor 625 to advance slack wire 185 out of the cabinet via cabinet exit guide 1000 to supply the welding torch device with slack wire 185.

The loop of slack wire 185 allows the pulling action of the slack wire pulling unit on the demand side of the wire to be decoupled from the possible negative impacts caused by the supply spool 50 providing the metal wire 180. Any rotational inertia from the spool and mass of wire withdrawn from the wire spool can be addressed by the intake portion of the wire feed system (such as sensing device 110 and motor 225 of the tension unit) or absorbed by the loop of slack wire 185, preventing it from being transmitted to the wire in the vicinity of the welding torch. The system allows the unspooling of wire at the inlet side of the wire feeding system to be separated from advancing wire to the welding torch. Because the loop of slack wire is free-hanging within the cabinet off of wire guides 400 and 500, the wire of the loop is not under tension and easily can be advanced by the actions of motor 225 or 625. The loop of slack wire 185 also allows the wire supply spool 50 to be replaced without stopping deposition of metal on the work piece. The loop of slack wire 185 also allows the wire to be provided to the welding torch at a constant speed by providing a length of wire as a buffer between the wire supply spool 50 and the wire provider of the welding torch.

The wire feeding system is designed to reduce the slippage of the wire which can happen due to rotational inertia of the wire supply spool. Slippage can cause deformations in the wire or other problems that are manifested when trying to align the metal wire in the arc of the welding torch. In preferred embodiments, the wire is straight rather than curved as used in some systems. In particular, the metal wire is straight and can be used in a two torch system, such as described in Stempfer (US Pat. App. Pub. No. US2014/0061165). In such systems, it is important that the wire feeding unit is capable of delivering a straight metal wire in order to maintain alignment of the metal wire in the plasma arc of the welding torch.

Each of the components of the wire feed system within the cabinet except sensing device 110 is ultimately connected to the back plate 900. The back plate 900 can be of any material suitable to support the components of the wire feed system. In some embodiments, back plate 900 can be carbon steel, stainless steel, a steel selected from among S355, S355JR, S355J2, S355J2+N, and S450J0, an aluminum alloy, such as an aluminum alloy selected from among AA 6063, AA 6063-T6, EN AW-6063T6, AW-6082-T6 and EN AW-6063T6/6082T6, an Inconel® nickel-chromium alloy, a Monel® nickel-copper alloy or a ToughMet® copper-nickel-tin alloy.

The metal wire 180 that forms the loop of slack wire 185 can be of any metal used in plasma arc welding, particularly plasma transferred arc welding. The metal wire can be or contain titanium. The metal wire can be or contain a titanium alloy containing Ti in combination with one or a combination of Al, V, Sn, Zr, Mo, Nb, Cr, W, Si, and Mn. For example, exemplary titanium alloys include Ti-6Al-4V, Ti-6Al-6V-2Sn, Ti-6Al-2Sn-4Zr-6Mo, Ti-45Al-2Nb-2Cr, Ti-47Al-2Nb-2Cr, Ti-47Al-2W-0.5Si, Ti-47Al-2Nb-1Mn-0.5W-0.5Mo-0.2Si, and Ti-48Al-2Nb-0.7Cr-0.3Si. The metal wire can contain aluminum, iron, cobalt, copper, nickel, carbon, titanium, tantalum, tungsten, niobium, gold, silver, palladium, platinum, zirconium, alloys thereof, and combinations thereof. The metal wire can have a circular cross section. The metal wire can be of any diameter or dimension. In some embodiments, the diameter of the metal wire can be in the range of from about 0.1 mm to about 10 mm. For example, the metal wire can have a diameter of, e.g., 1.0 mm, 1.6 mm, or 2.4 mm.

The wire supply system can be used to supply metal wire to any welding torch. An exemplary welding torch is a PAW torch. The PAW torch can be of any configuration capable of creating an electric arc to heat and melt the metal wire, such as gas metal arc welding (GMAW), particularly using inert gases to make the arc (metal inert gas welding or MIG-welding). An exemplary PAW torch is a PTA torch. The metal wire is made to melt in the plasma produced by torch using an electric arc, and the melting metal wire is deposited into the molten pool on the workpiece to add to, and to form, the near net shape metal bodies. The feed rate and positioning of the metal wire can be controlled and modulated in accordance with the effect of the power supply to the PAW torch in order to ensure that the metal wire is being continuously heated and is melted when it reaches the intended position above the molten pool in the base material. Exemplary welding systems are described in Guldberg (WO 2011/019287), Ireland et al. (U.S. Pat. No. 7,220,935); Comon et al. (U.S. Pat. No. 9,145,832); Cooper et al. (U.S. Pat. App. Pub. No. US 2010/0276396); Biskup et al. (US Pat. App. Pub. No. 2013/0140280); and Stempfer (US. Pat. App. Pub. No. 2014/0061165).

Although the preceding description describes the innovation in significant detail, it should not be construed as limiting the scope of the invention but rather as providing illustrations of various embodiments of the invention.

It will be apparent to those skilled in the art that various modifications and variations can be made in the present invention without departing from the scope of the invention. Thus, it is intended that the present invention cover the modifications and variations of this invention provided they come within the scope of the appended claims and their equivalents.

REFERENCE SIGNS LIST

The following is a listing of the reference numerals used in the description and the accompanying Drawings.

10 Wire supply unit
20 Wire tension unit
30 Wire buffer unit
40 Slack wire delivery unit
50 Wire supply spool
55 Pivot
60 Vertical support element
65 Traverse support element
70 First lateral support element
71 Second lateral support element
72 Front mounting support
73 Front mounting support
74 Rear mounting support
75 Rear mounting support
78 Frame crossbeam
100 Frame
101 Hinge
103 Upper transparent window
104 Lower transparent door(s)
110 Sensing device
120 Aperture
122 Position sensor
130 First receiving wheel of wire receiving unit
135 Second receiving wheel of wire receiving unit
140 Optional bracket
145 Optional bracket
180 Metal wire
185 Slack wire
200 Wire feeding device
205 Passive grooved roller
210 Arm
220 Motorized grooved roller
225 Motor
300 First slack wire guide
305 Dual grooved roller
310 Arm
320 Dual grooved roller
330 Support
400 Second slack wire guide
405 Passive grooved roller
410 Arm
420 Passive grooved roller
430 Support
500 Third slack wire guide
505 Passive grooved roller
510 Arm
520 Passive grooved roller
530 Support
600 Slack wire pulling device
605 Passive grooved roller
610 Arm
620 Motorized grooved roller
625 Motor
700 Loop sensing device
710 Sensor
720 Sensor
730 Sensor 740 Sensor
780 Support element
790 Support element
800 Pressure device
850 Pressure device
900 Back plate
1000 Cabinet exit guide

What is claimed is:

1. A metal wire feeding system, comprising:
a wire supply spool;
a cabinet;
a wire feeding device for feeding wire from the wire supply spool into the cabinet;
a first slack wire guide positioned in the cabinet to receive wire from the wire feeding device in a first groove;
a second slack wire guide positioned in the cabinet to receive the wire from the first slack wire guide;
a third slack wire guide positioned in the cabinet to receive the wire from the second slack guide and to feed the wire to a second groove of the first slack wire guide;
a slack wire pulling device positioned in the cabinet to receive the wire from the second groove of the first slack wire guide; and
a cabinet exit guide through which the wire exits the cabinet.

2. The metal wire feeding system of claim 1, wherein:
the first slack wire guide comprises:
a first dual grooved roller having the first groove and the second groove, the roller being attached to a first arm pivotally connected to a back plate of the cabinet; and
a second dual grooved roller having a first and second groove, where the first groove of the first grooved roller and the first groove of the second grooved roller form a channel therebetween, and the first groove of the first dual grooved roller is biased by a first spring on the first arm connected to a first support connected to the back plate of the cabinet;
the second slack wire guide comprises:
a third passive grooved roller attached to a second arm pivotally connected to the back plate of the cabinet; and
a fourth passive grooved roller, where the groove of the third passive roller and the groove of the fourth passive roller form a channel therebetween, and the groove of the third passive roller is biased by a second spring on the second arm connected to a second support connected to the back plate of the cabinet; and
the third slack wire guide comprises:
a fifth passive grooved roller attached to a third arm pivotally connected to the back plate of the cabinet; and
a sixth passive grooved roller, where the groove of the fifth passive roller and the groove of the sixth passive roller form a channel therebetween, and the groove of the fifth passive roller is biased by a third spring on the third arm connected to a third support connected to the back plate of the cabinet;
wherein the first, second and third slack wire guides form a loop pathway from first wire guide to the second wire guide to the third wire guide and then back to the first wire guide.

3. The metal wire feeding system of claim 1, wherein the wire feeding device comprises a first motorized grooved roller and a first passive grooved roller, and the slack wire pulling device comprises a second motorized grooved roller and a second passive grooved roller.

4. The metal wire feeding system of claim 3, wherein the wire feeding device includes a first motor and the slack wire pulling device includes a second motor, wherein the first motor and the second motor each separately is selected from among a direct-current motor driven by a power control signal and a stepper motor.

5. The metal wire feeding system of claim 1, further comprising an entry wire position detector that includes a first sensor that detects a position of a metal wire within an aperture in the cabinet.

6. The metal wire feeding system of claim 5 wherein the first sensor is in communication with a control system that can reposition the wire supply spool in at least one of the X-, Y- or Z-direction or any combination thereof.

7. The metal wire feeding system of claim 1, wherein the cabinet further comprises a transparent window or a transparent door or both to allow viewing of the components in the cabinet without opening the cabinet.

8. The metal wire feeding system of claim 7, wherein the transparent window or transparent door is made of glass, acrylic (poly(methyl methacrylate) or PMMA), polyethylene terephthalate glycol-modified (PETG), or polycarbonate.

9. The metal wire feeding system of claim 1, wherein the wire feeding device is configured to feed wire wound on the wire supply spool into the cabinet.

10. The metal wire feeding system of claim 1, further comprising a pressure device to regulate an amount of pressure exerted by a first passive grooved roller associated with the wire feeding device or by a second passive grooved roller associated with the slack wire pulling device.

11. The metal wire feeding system of claim 10, wherein the pressure device comprises a hydraulically, pneumatically, mechanically or electronically driven piston that when moved in a first direction increases the pressure applied to the first passive grooved roller or the second passive grooved roller, and that when moved in a second direction decreases the pressure applied to the first passive grooved roller or the second passive grooved roller.

12. The metal wire feeding system of claim 1, wherein at least one of a first motor of the wire feeding device is connected to a first motorized grooved roller to rotate the first motorized grooved roller or a second motor of the slack wire pulling device is connected to a second motorized grooved roller to rotate the second motorized grooved roller.

13. The metal wire feeding system of claim 1, wherein a first motor of the wire feeding device operates independently of the slack wire pulling device.

14. The metal wire feeding system of claim 1, wherein the cabinet further comprises a loop sensing device.

15. The metal wire feeding system of claim 14, the loop sensing device comprising:
a) a first sensor in communication with a control system, wherein the first sensor sends a signal to the control system to shut down the wire feeding system and deposition process when the first sensor senses the loop of slack wire; or
b) a second sensor in communication with a control system, wherein the second sensor sends a signal to the control system to feed more metal wire into the cabinet when the second sensor senses the loop of slack wire; or
c) a third sensor in communication with the control system, wherein the third sensor sends a signal to the control system to feed less metal wire into the cabinet when the third sensor senses the loop of slack wire; or d) a fourth sensor in communication with the control system, wherein the fourth sensor sends a signal to the control system to stop feeding metal wire into the cabinet when the fourth sensor senses the loop of slack wire; or e) any combination of a), b), c) and d).

16. The metal wire feeding system of claim 1, wherein:
the first slack wire guide includes a first grooved roller disposed on a first arm, the first grooved roller being biased toward a first cooperating roller by a first spring associated with the first arm to form a first channel;
the second slack wire guide includes a second grooved roller disposed on a second arm, the second grooved roller being biased toward a second cooperating roller by a second spring associated with the second arm; and
the third slack wire guide includes a third grooved roller disposed on a third arm, the third grooved roller being biased toward a third cooperating roller by a third spring associated with the third arm.

17. The metal wire feeding system of claim 1, wherein:
the first slack wire guide is positioned between the wire feeding device and the slack wire pulling device,
the second slack wire guide is positioned on a first side of and below the first slack wire guide,
the third slack wire guide is positioned on a second side of and below the first slack wire guide, the second side being opposite the first side, and
the wire forms a loop below and between the second slack wire guide and the third slack wire guide.

18. The metal wire feeding system of claim 17, further comprising one or more sensors disposed below the first slack wire guide, the one or more sensors configured to detect a lower portion of the loop between the second slack wire guide and the third slack wire guide and below the first slack wire guide.

19. The metal wire feeding system of claim 18, wherein the one or more sensors comprise a plurality of sensors arranged at different distances below the first slack wire guide to detect the lower portion of the loop at different loop sizes.

20. The metal wire feeding system of claim 1, wherein at least one of the first slack wire guide, the second slack wire guide, or the third slack wire guide comprises one or more grooved rollers disposed on an arm, the arm being configured to move relative to the cabinet and being biased by a spring on the arm.

* * * * *